United States Patent
Nagoya et al.

(10) Patent No.: US 8,417,677 B2
(45) Date of Patent: Apr. 9, 2013

(54) COMMUNICATION MANAGEMENT SYSTEM, COMMUNICATION MANAGEMENT METHOD AND COMMUNICATION CONTROL DEVICE

(75) Inventors: Mitsugu Nagoya, Tokyo (JP); Genta Iha, Tokyo (JP); Kimie Katagiri, Tokyo (JP)

(73) Assignee: Duaxes Corporation (JP)

( * ) Notice: Subject to any disclaimer, the term of this patent is extended or adjusted under 35 U.S.C. 154(b) by 0 days.

(21) Appl. No.: 12/302,467

(22) PCT Filed: Jun. 2, 2006

(86) PCT No.: PCT/JP2006/311130
§ 371 (c)(1),
(2), (4) Date: Nov. 25, 2008

(87) PCT Pub. No.: WO2007/141835
PCT Pub. Date: Dec. 13, 2007

(65) Prior Publication Data
US 2010/0138382 A1 Jun. 3, 2010

(51) Int. Cl.
*G06F 7/00* (2006.01)
(52) U.S. Cl.
USPC .......................................... 707/694; 707/754
(58) Field of Classification Search ................ 707/694, 707/754
See application file for complete search history.

(56) References Cited

U.S. PATENT DOCUMENTS

| | | | |
|---|---|---|---|
| 2005/0022014 A1* | 1/2005 | Shipman | 713/201 |
| 2006/0041527 A1* | 2/2006 | Fessler | 707/1 |
| 2006/0174341 A1* | 8/2006 | Judge | 726/22 |
| 2007/0006314 A1* | 1/2007 | Costa et al. | 726/25 |
| 2008/0256647 A1* | 10/2008 | Kim et al. | 726/32 |
| 2010/0169195 A1* | 7/2010 | Trest | 705/34 |

FOREIGN PATENT DOCUMENTS

| | | |
|---|---|---|
| JP | 4-180425 | 6/1992 |
| JP | 2004-104739 | 4/2004 |
| JP | 2004-533677 | 11/2004 |
| JP | 2005-332048 | 12/2005 |
| JP | 2006-018635 | 1/2006 |
| JP | 2006-065488 | 3/2006 |
| JP | 2006-67293 | 3/2006 |
| JP | 2006-79181 | 3/2006 |
| JP | 2006-121209 | 5/2006 |

OTHER PUBLICATIONS

International Search Report for PCT/JP2006/311130 mailed Aug. 29, 2006 (3 pages).
Office Action dated May 22, 2007 issued by the Japanese Patent Office in corresponding Application No. 2007-507600, 4 pages.
Patent Abstracts of Japan, Publication No. 2006-065488 dated Mar. 9, 2006, 1 page.

(Continued)

*Primary Examiner* — James Trujillo
*Assistant Examiner* — Linh Black
(74) *Attorney, Agent, or Firm* — Martin E. Hsia

(57) ABSTRACT

A communication management system includes a terminal which has a peer to peer connection to communicate with a node conducting peer to peer communication, a content detector which, when the terminal receives from the node a content of which distribution should be controlled, detects identification information of the content, and a communication control apparatus which refers to the detected identification information to control transmission of the content of which distribution should be controlled.

10 Claims, 31 Drawing Sheets

OTHER PUBLICATIONS

English language abstract of Japanese Publication No. 2004-533677 dated Nov. 4, 2004, 1 page.
International Preliminary Report on Patentability issued in related Application No. PCT/JP2006/310496 dated Dec. 10, 2008, 8 pages.
Office Action issued by the Japanese Patent Office in related Application No. 2007-507599 dated May 22, 2007, 4 pages.
"Approaches to Controlling Peer-to-Peer Traffic: A Technical Analysis" as of Dec. 3, 2005, P-Cube, Inc., 9 pages.
Patent Abstracts of Japan, Publication No. 2004-104739 dated Apr. 2, 2004, 1 page.
International Search Report for PCT/JP2006/310496, mailed Aug. 29, 2006, 3 pages.
English abstract from esp@cenet for patent application with Publication No. JP2006018635, Publication Date: Jan. 19, 2006, 1 page.
English abstract from esp@cenet for patent application with Publication No. JP2006067293, Publication Date: Mar. 9, 2006, 1 page.
English translation of International Preliminary Report on Patentability and the Written Opinion of the International Searching Authority for International application No. PCT/JP2006/311130, dated Jan. 13, 2009, 8 pages.

* cited by examiner

| URL |
|---|
| http://www.xxx.xxx/x5.html |
| http://www.xx.xx/******** |
| ⋮ |

| 62 | 64 |
|---|---|
| MATCHED | PERMIT |
| NOT MATCHED | DISCARD |

| 62 | 64 |
|---|---|
| 0 | PERMIT |
| 3 | DISCARD |
| 4 | REPLACEMENT |
| 7 | ROUTING |
| 8 | SWITCHING |
| ⋮ | ⋮ |

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | STANDBY | - |

| APPARATUS ID | OPERATING STATE | USER ID |
|---|---|---|
| 1 | OPERATING | 000001~100000 |
| 2 | FAILURE | - |
| 3 | OPERATING | 200001~300000 |
| 4 | OPERATING | 300001~400000 |
| 5 | OPERATING | 400001~465183 |
| 6 | OPERATING | 100001~200000 |

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | STANDBY | – |

FIG.21B

| APPARATUS ID | OPERATING STATE | USER ID |
|---|---|---|
| 1 | OPERATING | 000001~100000 |
| 2 | OPERATING | 100001~200000 |
| 3 | OPERATING | 200001~300000 |
| 4 | OPERATING | 300001~400000 |
| 5 | OPERATING | 400001~465183 |
| 6 | DATA UPDATING | 000001~100000 |

FIG.21C

| APPARATUS ID | OPERATING STATE | USER ID |
|---|---|---|
| 1 | STANDBY | – |
| 2 | OPERATING | 100001~200000 |
| 3 | OPERATING | 200001~300000 |
| 4 | OPERATING | 300001~400000 |
| 5 | OPERATING | 400001~465183 |
| 6 | OPERATING | 000001~100000 |

FIG.31A

| CATEGORY NO. | FILE NAME | SIZE | HASH VALUE |
|---|---|---|---|
| 0 | MOVIE | 2,944,237 | xxx |
| 0 | IMAGE COLLECTION | 650,175 | xxx |
| ⋮ | ⋮ | ⋮ | ⋮ |

| CATEGORY NO. | FILE NAME | SIZE | HASH VALUE |
|---|---|---|---|
| 1 | LAWS AND REGULATIONS | 565,420 | xxx |
| 1 | REGARDING PROCEDURES | 1,859 | xxx |
| ⋮ | ⋮ | ⋮ | ⋮ |

| CATEGORY NO. | FILE NAME | SIZE | HASH VALUE |
|---|---|---|---|
| 3 | CRIME DATABASE | 1,057,249 | xxx |
| 4 | DRUG | 45,817 | xxx |
| ⋮ | ⋮ | ⋮ | ⋮ |

| CATEGORY NO. | FILE NAME | SIZE | HASH VALUE |
|---|---|---|---|
| 165 | 166 | 167 | 170 |
| 1 | MOVIE "○×" | 4,685,197 | xxx |
| 1 | MOVIE "○○" | 9,445,102 | xxx |
| ⋮ | ⋮ | ⋮ | ⋮ |
| 1 | MOVIE "××" | 2,944,237 | xxx |
| 2 | BEETHOVEN: SONATA | 650,175 | xxx |
| 2 | CHOPIN: NOCTURNE | 472,969 | xxx |
| ⋮ | ⋮ | ⋮ | ⋮ |
| 2 | MOZART: TURKISCHER MARSCH | 1,114,710 | xxx |
| 3 | GAME "×○" | 945,012 | xxx |
| 3 | GAME "○○××" | 487,001 | xxx |
| ⋮ | ⋮ | ⋮ | ⋮ |

164

FIG.33A
VIRUS LIST 
FIG.33B
WHITELIST 
FIG.33C
BLACKLIST 
FIG.33D
COMMON CATEGORY LIST
| USER ID | CATEGORY ||||||
|---|---|---|---|---|---|---|
| | 1 | 2 | 3 | 4 | 5 | ...... | 57 |
| 000001 | ○ | × | × | ○ | ○ | ...... | × |
| 000002 | ○ | ○ | × | × | ○ | ...... | ○ |
| 000003 | ○ | ○ | × | ○ | × | ...... | ○ |
| ⋮ | ⋮ | ⋮ | ⋮ | ⋮ | ⋮ | ⋮ | ⋮ |
60

COMMUNICATION MANAGEMENT SYSTEM, COMMUNICATION MANAGEMENT METHOD AND COMMUNICATION CONTROL DEVICE

TECHNICAL FIELD

The present invention relates to a communication management technique, and particularly to a communication management system, a communication management method and a communication control apparatus for managing distribution of contents transmitted via peer to peer (P2P) communication or the like.

BACKGROUND ART

Due to improved Internet infrastructures and the widespread of communication terminals, such as cellular phone terminals, personal computers, and VoIP (Voice over Internet Protocol) phone sets, the number of Internet users is now exploding. Under such circumstances, security problems such as computer viruses, hacking and spam mails have become apparent, requiring appropriate techniques for communication control. Also, since improved communication environments have enormously increased communication traffic, there are required communication control apparatuses that enable high-speed processing of a large volume of data.
[Patent Document 1] Japanese Patent Application Laid-open No. 4-180425.

DISCLOSURE OF THE INVENTION

Problem to be Solved by the Invention

In recent years, the number of users of file-sharing networks using P2P communication has been increasing. Such users have rapidly increased because the users can easily obtain desired contents by sharing their contents among each other. On the other hand, a series of problems, such as copyright infringement of contents, distribution of illegal contents, and spread of computer viruses targeting file-sharing networks, have become apparent and are now regarded as social issues. Accordingly, there is an urgent need to develop appropriate techniques for managing content distribution.

The present invention has been made in view of such a situation, and a general purpose thereof is to provide a technique for managing content distribution appropriately.

Means for Solving the Problem

One aspect of the present invention relates to a communication management system. The communication management system comprises: a terminal which has a peer to peer connection to communicate with a node conducting peer to peer communication; a content detector which, when the terminal receives from the node a content of which distribution should be controlled, detects identification information of the content; and a communication control apparatus which refers to the detected identification information to control transmission of the content of which distribution should be controlled.

The identification information of the content may include the file name, file size, or hash value of the content.

The communication control apparatus may comprise: a database which stores identification information of the content detected by the content detector; a search circuit which acquires data of a content and searches the database for identification information of the content; and a process execution circuit which performs processing for controlling the distribution of the content in accordance with the search result of the search circuit.

The communication management system may further comprise: a content database which stores identification information of the content of which distribution should be controlled, in which the identification information is detected by the content detector; and a database server which refers to the content database to update the database of the communication control apparatus.

When, in the peer to peer communication, the node requested to search for a content transmits to the request source of the search a response including identification information of a content registered in the database, the process execution circuit may delete the identification information of the content.

When, in the peer to peer communication, the node requested to search for a content transmits to the request source of the search a response including identification information of a content registered in the database, the process execution circuit may change the address of a node distributing the content to the address of a warning content server which issues a warning that the distribution of the content should be restricted.

When identification information of a content transmitted from the node to another apparatus matches identification information registered in the database in the peer to peer communication, the process execution circuit may block the transmission of the content.

When identification information of a content transmitted from the node to another apparatus matches identification information registered in the database in the peer to peer communication, the process execution circuit may replace the content with a warning content for warning that the distribution of the content should be restricted.

The communication control apparatus may be configured using FPGA (Field Programmable Gate Array) or may be configured with a wired logic circuit.

Another aspect of the present invention relates to a communication management method. The communication management method comprises: detecting, when a terminal having a peer to peer connection to communicate with a node conducting peer to peer communication receives from the node a content of which distribution should be controlled, the identification information of the content; and referring to the detected identification information to control transmission of the content of which distribution should be controlled.

Yet another aspect of the present invention relates to a communication control apparatus. The communication control apparatus comprises: a database which stores identification information of a content detected as a content of which distribution should be controlled, among contents transmitted between nodes through peer to peer communication; a search circuit which acquires data of a content and searches the database for identification information of the content; and a process execution circuit which performs processing for controlling the distribution of the content in accordance with the search result of the search circuit.

Optional combinations of the aforementioned constituting elements, and implementations of the invention in the form of methods, apparatuses, systems, recording mediums and computer programs may also be practiced as additional modes of the present invention.

Advantageous Effects

The present invention provides a technique for managing content distribution appropriately.

BRIEF DESCRIPTION OF THE DRAWINGS

FIG. 6 is a diagram that shows another example of the position detection circuit.

FIG. 14 is a diagram that shows still yet another example of internal data of the first database.

FIG. 15 is a diagram that shows an example of internal data of a second database.

FIG. 16 is a diagram that shows another example of internal data of the second database.

FIG. 19 is a diagram that shows an example of internal data of a management table provided in an operation monitoring server.

FIG. 20 is a diagram for describing an operational procedure performed in the event that a communication control apparatus fails.

FIGS. 21A, 21B and 21C are diagrams for describing a procedure for updating databases in the communication control apparatuses.

FIG. 31A is a diagram that shows an example of internal data of a virus list; FIG. 31B is a diagram that shows an example of internal data of a whitelist; and FIG. 31C is a diagram that shows an example of internal data of a blacklist.

FIG. 32 is a diagram that shows an example of internal data of a common category list.

FIGS. 33A, 33B, 33C and 33D are diagrams that show examples of internal data of the second database.

Figure 1:
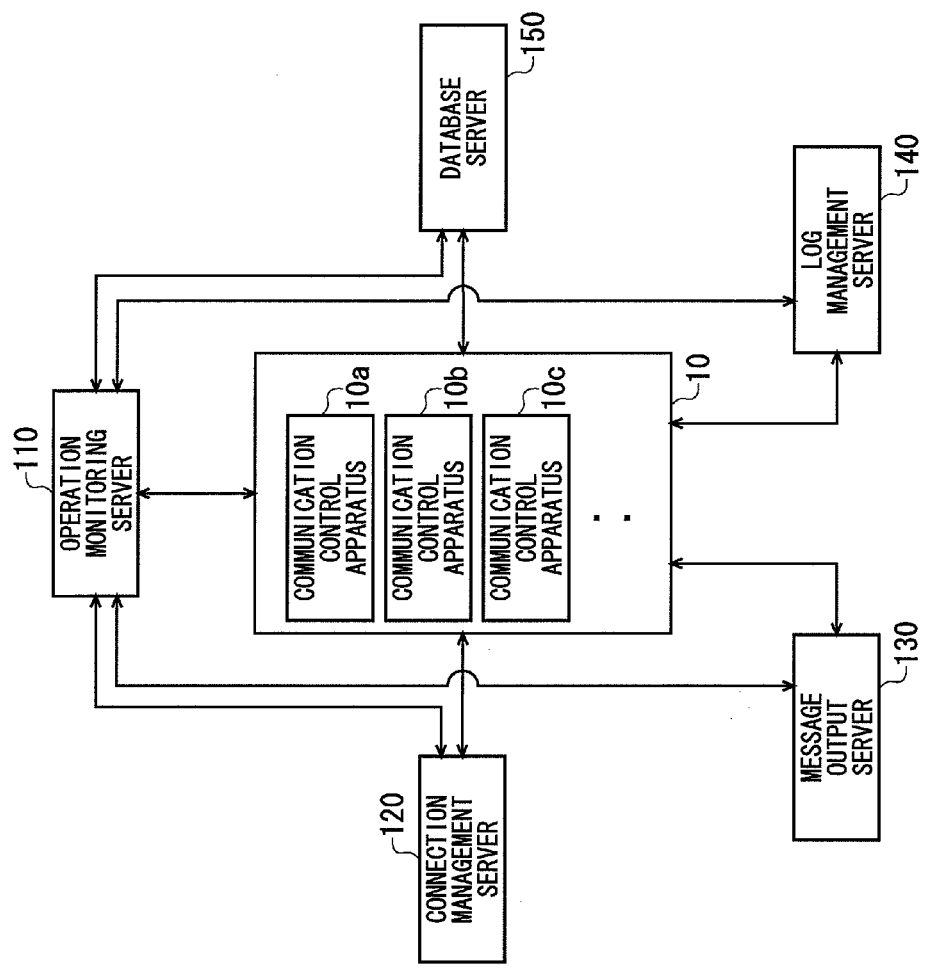
FIG. 1 is a diagram that shows a configuration of a communication control system according to a base technology.

| [Explanation of Reference Numerals] | |
| --- | --- |
| 10 | communication control apparatus |
| 20 | packet processing circuit |
| 30 | search circuit |
| 32 | position detection circuit |
| 33 | comparison circuit |
| 34 | index circuit |
| 35 | comparison circuit |
| 36 | binary search circuit |
| 36A, 36B and 36C | comparison circuits |
| 36Z | control circuit |
| 40 | process execution circuit |
| 50 | first database |
| 57 | user database |
| 60 | second database |
| 70 | decoder circuit |
| 72 | decryption key |
| 100 | communication control system |
| 110 | operation monitoring server |
| 120 | connection management server |
| 130 | message output server |
| 140 | log management server |
| 150 | database server |
| 161 | virus list |
| 162 | whitelist |
| 163 | blacklist |
| 164 | common category list |
| 200 | communication path control apparatus |
| 300 | communication management system |
| 310 | user terminal |
| 320 | P2P node |
| 322 | P2P network |
| 330 | ISP |
| 340 | node detector |
| 350 | P2P node |
| 352 | P2P node detection network |
| 354 | illegal content detection network |
| 356 | illegal content detector |
| 360 | P2P node database |
| 362 | illegal content database |
| 364 | warning content server |
| 390 | Internet |

BEST MODE FOR CARRYING OUT THE INVENTION

First, as a base technology, a communication control system that has no CPU or OS and performs a packet filtering function using a dedicated hardware circuit will be described. Thereafter, there will be described as an embodiment a technique for managing P2P communication using the communication control system of the base technology.

(Base Technology)

FIG. 1 shows a configuration of a communication control system according to the base technology. A communication control system 100 comprises a communication control apparatus 10 and various peripheral apparatuses provided to support the operation of the communication control apparatus 10. The communication control apparatus 10 of the base technology performs a packet filtering function provided by an Internet service provider or the like. The communication control apparatus 10 provided on a network path acquires a packet transmitted via the network, analyzes the content, and determines whether or not the packet communication should be permitted. If the communication is permitted, the communication control apparatus 10 will transmit the packet to the network. If the communication is prohibited, the communication control apparatus 10 will discard the packet and return a warning message or the like to the transmission source of the packet if necessary.

The communication control system 100 of the base technology includes multiple communication control apparatuses 10a, 10b, 10c, etc. and operates them functioning as one communication control apparatus 10. Hereinafter, each of the communication control apparatuses 10a, 10b, 10c, etc. and their collective body will be both referred to as a communication control apparatus 10 with no distinction.

In the communication control system 100 of the base technology, each communication control apparatus 10 stores the respective shares of at least part of databases necessary for packet processing; there are provided as many as the number of communication control apparatuses 10 required to share and store such databases, and at least one more apparatus is provided extra. For example, when the number of pieces of data is 300,000 or above but less than 400,000, the number of communication control apparatuses required for operation is four. However, one or more communication control apparatuses 10 should be further provided as standby units in case any of the communication control apparatuses 10 in operation fails or in case a database in any of the communication control apparatuses 10 is updated. Accordingly, at least five communication control apparatuses 10 are provided in total. Conventionally, the entire system has needed to be duplexed considering fault tolerance. According to the technique of the base technology, in contrast, a divided unit of the communication control apparatus 10 may be only provided extra, thereby enabling cost reduction. The operating state of the multiple communication control apparatuses 10a, 10b, 10c, etc. is managed by an operation monitoring server 110. The operation monitoring server 110 of the base technology has a management table for managing the operating state of the communication control apparatuses.

The peripheral apparatuses include the operation monitoring server 110, a connection management server 120, a message output server 130, a log management server 140 and a database server 150. The connection management server 120 manages connection to the communication control apparatus 10. When the communication control apparatus 10 processes a packet transmitted from a cellular phone terminal, for example, the connection management server 120 authenticates the user as a user entitled to enjoy the service of the communication control system 100, based on information included in the packet, which uniquely identifies the cellular phone terminal. Once the user is authenticated, packets transmitted from the IP address, which is temporarily provided for the cellular phone terminal, will be transmitted to the communication control apparatus 10 and processed therein, without being authenticated by the connection management server 120 during a certain period. The message output server 130 outputs a message to the destination or the source of packet transmission, according to whether the communication control apparatus 10 has permitted the packet communication. The log management server 140 manages the operating history of the communication control apparatus 10. The database server 150 acquires the latest database from an external source and provides the database to the communication control apparatus 10. To update the database without halting the operation of the communication control apparatus 10, the apparatus may possess a backup database. The operation monitoring server 110 monitors the operating state of the communication control apparatus 10 and its peripheral apparatuses including the connection management server 120, message output server 130, log management server 140 and database server 150. The operation monitoring server 110 has the highest priority in the communication control system 100 and performs supervisory control of the communication control apparatus 10 and all the peripheral apparatuses. Although the communication control apparatus 10 is configured with a dedicated hardware circuit, as will be described later, the operation monitoring server 110 can monitor the operating state even while the communication control apparatus 10 is in operation, by inputting to or outputting from the communication control apparatus 10 the data for monitoring by means of a boundary-scan circuit based on the technique described in Japanese Patent No. 3041340 filed by the present applicant or other techniques.

In the communication control system 100 of the base technology, as will be described below, the communication control apparatus 10, configured with a dedicated hardware circuit for faster operation, is controlled by using a group of peripheral servers connected thereto and having various functions. Accordingly, by suitably replacing the software of the group of servers, a wide variety of functions can be achieved with a similar configuration. Thus, the base technology provides such communication control system having high flexibility.

Figure 2:
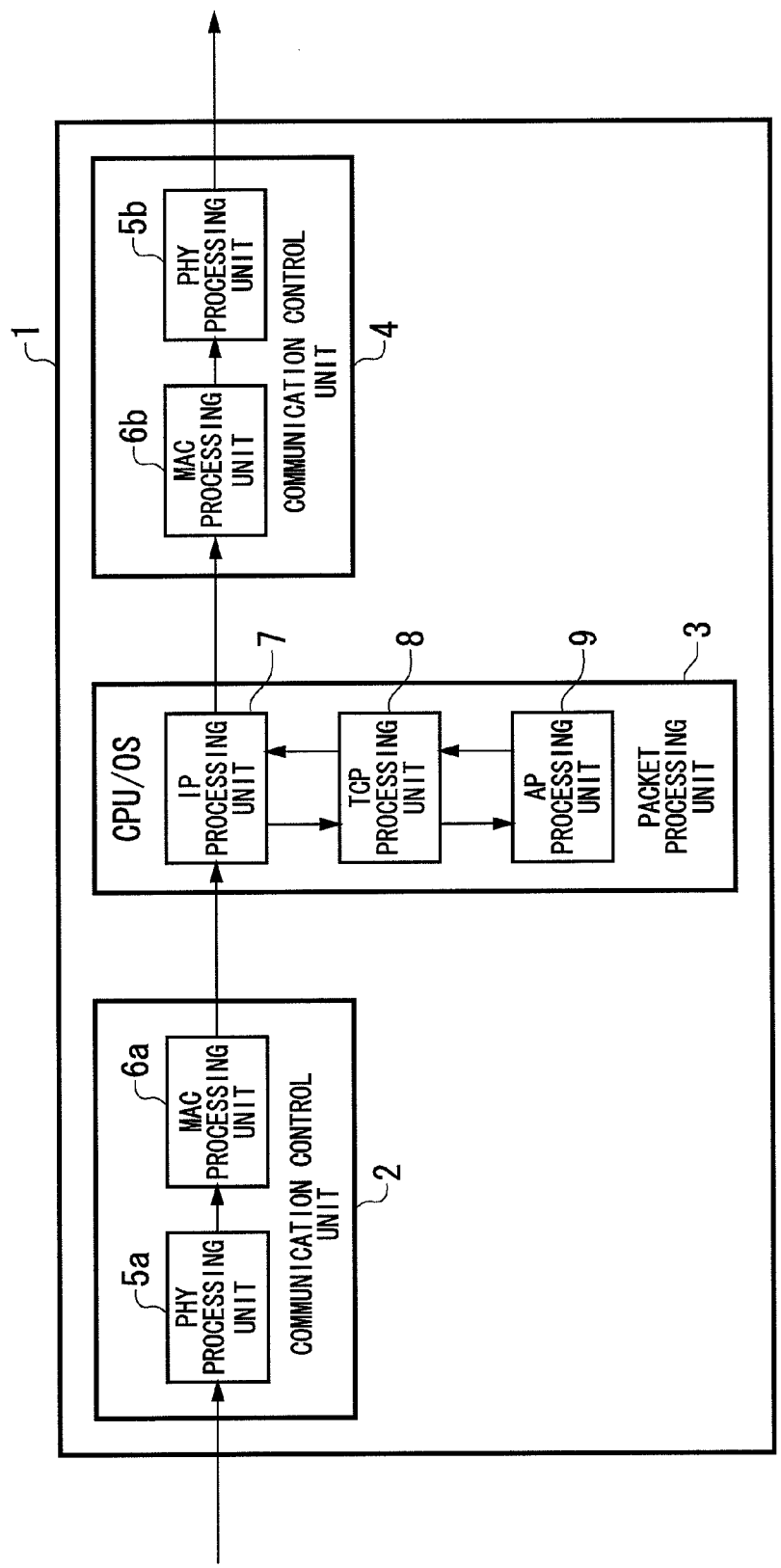
FIG. 2 is a diagram that shows a configuration of a conventional communication control apparatus.

FIG. 2 shows a configuration of a conventional communication control apparatus 1. The conventional communication control apparatus 1 comprises a communication control unit 2 on the receiving side, a packet processing unit 3, and a communication control unit 4 on the sending side. The communication control units 2 and 4 include PHY processing units 5a and 5b for performing physical layer processing of packets, and MAC processing units 6a and 6b for performing MAC layer processing of packets, respectively. The packet processing unit 3 includes protocol processing units for performing protocol-specific processing, such as an IP processing unit 7 for performing IP (Internet Protocol) processing and a TCP processing unit 8 for performing TCP (Transport Control Protocol) processing. The packet processing unit 3 also includes an AP processing unit 9 for performing application layer processing. The AP processing unit 9 performs filtering or other processing according to data included in a packet.

The packet processing unit 3 of the conventional communication control apparatus 1 is implemented by software, using a general-purpose processor, or CPU, and an OS running on the CPU. With such configuration, however, the performance of the communication control apparatus 1 depends on the performance of the CPU, hampering the creation of a communication control apparatus capable of high-speed processing of a large volume of packets. For example, a 64-bit CPU can process only up to 64 bits at a time, and hence, there has existed no communication control apparatus having a higher performance than this. In addition, since the conventional communication control apparatus is predicated on the presence of an OS with versatile functionality, the possibility of security holes cannot be eliminated completely, requiring maintenance work including OS upgrades.

Figure 3:
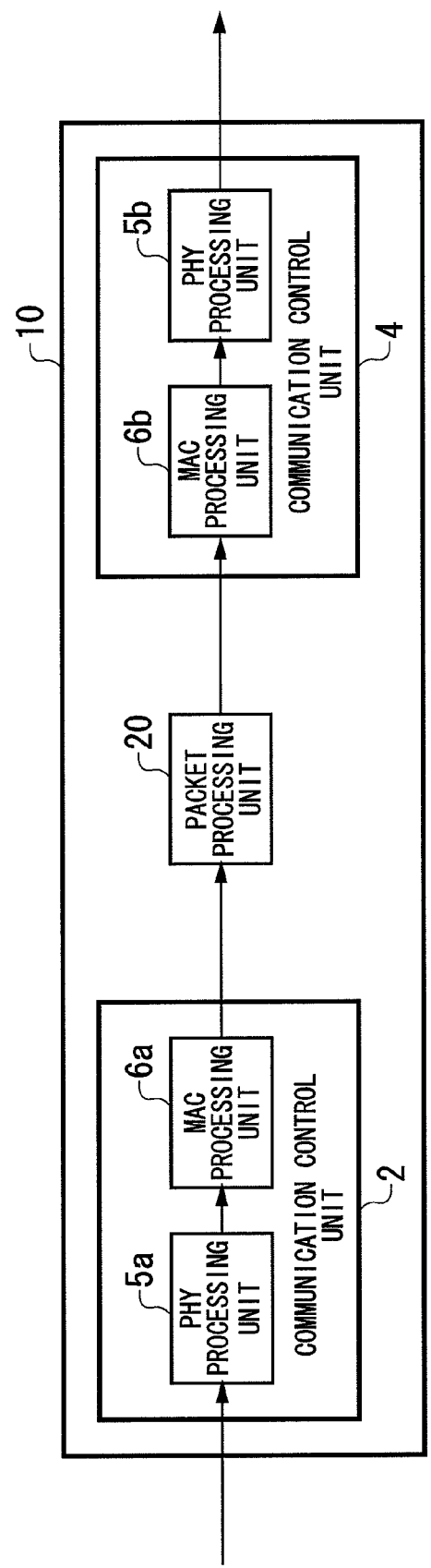
FIG. 3 is a diagram that shows a configuration of a communication control apparatus according to the base technology.

FIG. 3 shows a configuration of a communication control apparatus according to the base technology. A communication control apparatus 10 of the base technology comprises a packet processing circuit 20 configured with dedicated hardware employing a wired logic circuit, instead of a packet processing unit that is implemented by software including a CPU and an OS in a conventional communication control apparatus. By providing a dedicated hardware circuit to process communication data, rather than processing it with an OS and software running on a general-purpose processing circuit such as CPU, the performance limitations posed by the CPU or OS can be overcome, enabling a communication control apparatus having high throughput.

For example, a case will be considered here in which search is conducted in packet filtering or the like to check if the data in a packet includes reference data, which serves as criteria for filtering. When a CPU is used to compare the communication data with the reference data, there occurs a problem in that, since only 64-bit data can be compared at a time, the processing speed cannot be improved beyond such CPU performance. Since the CPU needs to repeat the process of loading 64 bits of communication data into a memory and comparing it with the reference data, the memory load time becomes a bottleneck that limits the processing speed.

In the base technology, by contrast, a dedicated hardware circuit configured with a wired logic circuit is provided to compare communication data with reference data. This circuit includes multiple comparators arranged in parallel, so as to enable the comparison of data having a length greater than 64 bits, such as 1024 bits. By providing dedicated hardware in such manner, bit matching can be simultaneously performed on a large number of bits in parallel. Since 1024-bit data can be processed at a time, while the conventional communication control apparatus 1 using a CPU processes only 64 bits, the processing speed can be improved remarkably. Increasing the number of comparators will improve the throughput, but also increase the cost and size of the apparatus. Accordingly, an optimal hardware circuit may be designed in accordance with the desired performance, cost or size.

Since the communication control apparatus 10 of the base technology is configured with dedicated hardware employing a wired logic circuit, it does not require any OS (Operating System). This can eliminate the need for the installation, bug fixes, or version upgrades of an OS, thereby reducing the cost and man-hours required for administration and maintenance. Also, unlike CPUs requiring versatile functionality, the communication control apparatus 10 does not include any unnecessary functions or use needless resources, and hence, reduced cost, a smaller circuit area or improved processing speed can be expected. Furthermore, again unlike conventional OS-based communication control apparatuses, the absence of unnecessary functions decreases the possibility of security holes and thus enhances the tolerance against attacks from malicious third parties over a network.

The conventional communication control apparatus 1 processes packets using software predicated on a CPU and an OS. Therefore, all packet data needs to be received before protocol processing is performed, and then the data is passed to an application. In contrast, since packet processing is performed by a dedicated hardware circuit in the communication control apparatus 10 of the base technology, all packet data need not be received before starting the processing; upon reception of necessary data, the processing can be started at any given point in time without waiting for the reception of subsequent data. For example, position detection processing in a position detection circuit, which will be described later, may be started at the time when position identification data for identifying the position of comparison target data is received. Thus, various types of processing can be performed in parallel without waiting for the reception of all data, reducing the time required to process packet data.

Figure 4:
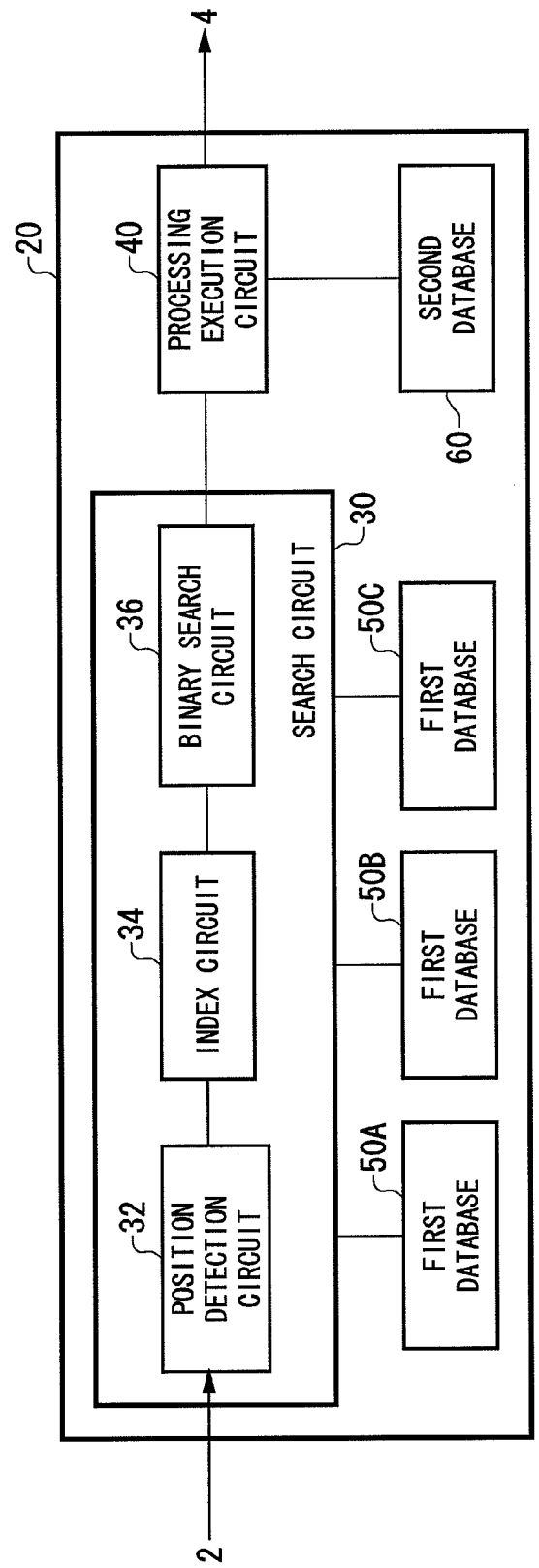
FIG. 4 is a diagram that shows a configuration of a packet processing circuit.

FIG. 4 shows an internal configuration of the packet processing circuit. The packet processing circuit 20 comprises: first databases 50A, 50B and 50C (hereinafter, they may be collectively referred to as "first databases 50") for storing reference data, which is referred to when processing to be performed on communication data is determined; a search circuit 30 for searching received communication data for the reference data by comparing the two; a second database 60 for storing a search result of the search circuit 30 and a content of processing to be performed on the communication data, which are related to each other; and a process execution circuit 40 for processing the communication data based on the search result of the search circuit 30 and the conditions stored in the second database 60.

The search circuit 30 includes: a position detection circuit 32 for detecting the position of comparison target data, which is to be compared with reference data, in communication data; an index circuit 34 which serves as an example of a determination circuit that determines which range the comparison target data belongs to among three or more ranges, into which the reference data stored in the first database 50 is divided; and a binary search circuit 36 for searching the determined range for the reference data that matches the comparison target data. The reference data may be searched for the comparison target data using any search technique, and a binary search method is used in the base technology. Since an improved binary search method is employed, as will be discussed later, three first databases 50 are provided in the base technology. The first databases 50A, 50B and 50C store the same reference data.

Figure 5:
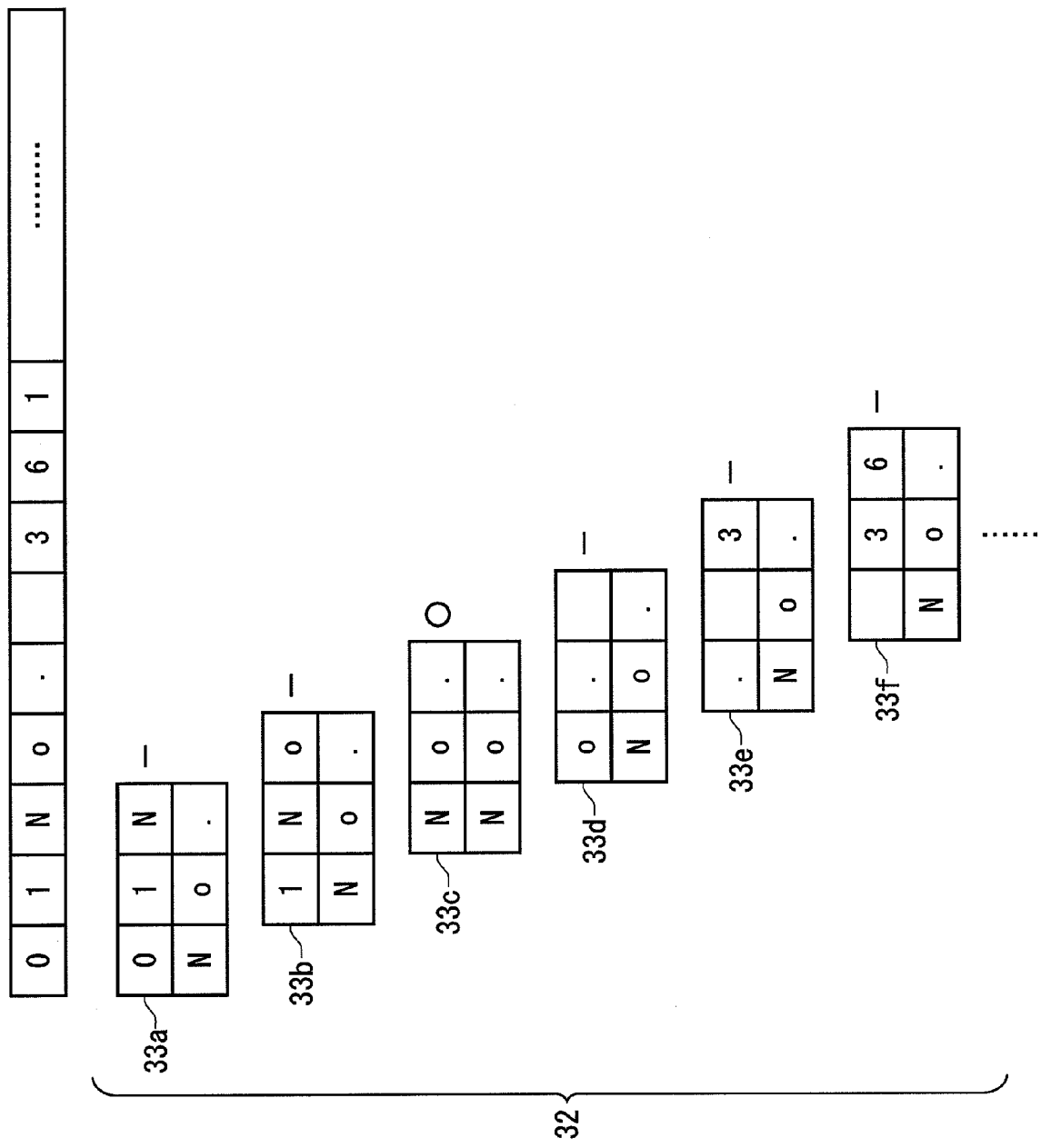
FIG. 5 is a diagram that shows a configuration of a position detection circuit.

FIG. 5 shows an internal configuration of the position detection circuit. The position detection circuit 32 includes multiple comparison circuits 33a-33f that compare communication data with position identification data for identifying the position of comparison target data. While six comparison circuits 33a-33f are provided here, the number of comparison circuits may be arbitrary, as will be described later. To the comparison circuits 33a-33f are input pieces of communication data, with each piece shifted from the preceding one by a predetermined data length, such as 1 byte. These multiple comparison circuits 33a-33f then simultaneously compare the respective communication data with the position identification data to be detected in parallel.

The base technology will be described by way of example for explaining the operation of the communication control apparatus 10, in which a character string "No. ###" in communication data is detected, the number "###" included in the character string is then compared with reference data, and if the number matches the reference data, the packet will be allowed to pass, while, if they do not match, the packet will be discarded.

In the example of FIG. 5, communication data "01No. 361 ..." is input to the comparison circuits 33a-33f with a shift of one character each, and position identification data "No." for identifying the position of the number "###" is sought to be detected in the communication data. More specifically, "01N" is input to the comparison circuit 33a, "1No" to the comparison circuit 33b, "No." to the comparison circuit 33c, "o." to the comparison circuit 33d, ". 3" to the comparison circuit 33e, and "36" to the comparison circuit 33f. Then, the comparison circuits 33a-33f simultaneously perform comparisons with the position identification data "No.". Consequently, there is found a match with the comparison circuit 33c, indicating that the character string "No." exists at the third character from the top of the communication data. Thus, it is found that the numeral data as comparison target data exists subsequent to the position identification data "No." detected by the position detection circuit 32.

When the same processing is performed by a CPU, since the comparison process needs to be serially performed one by one from the top, such as comparing character strings "01N" and "No." before comparing "1No" and "No.", no improvement of detection speed can be expected. In the communication control apparatus 10 of the base technology, in contrast, providing the multiple comparison circuits 33a-33f in parallel enables simultaneous parallel comparison processing, which could not have been performed with a CPU, improving the processing speed significantly. Providing more comparison circuits will improve the detection speed, as more characters can be compared simultaneously. In consideration of cost or size, a sufficient number of comparison circuits may be provided to achieve a desired detection speed.

Aside from detecting position identification data, the position detection circuit 32 may also be used as a circuit for detecting character strings for various purposes. Moreover, the position detection circuit 32 may be configured to detect position identification data in units of bits, not just as a character string.

Figure 6:
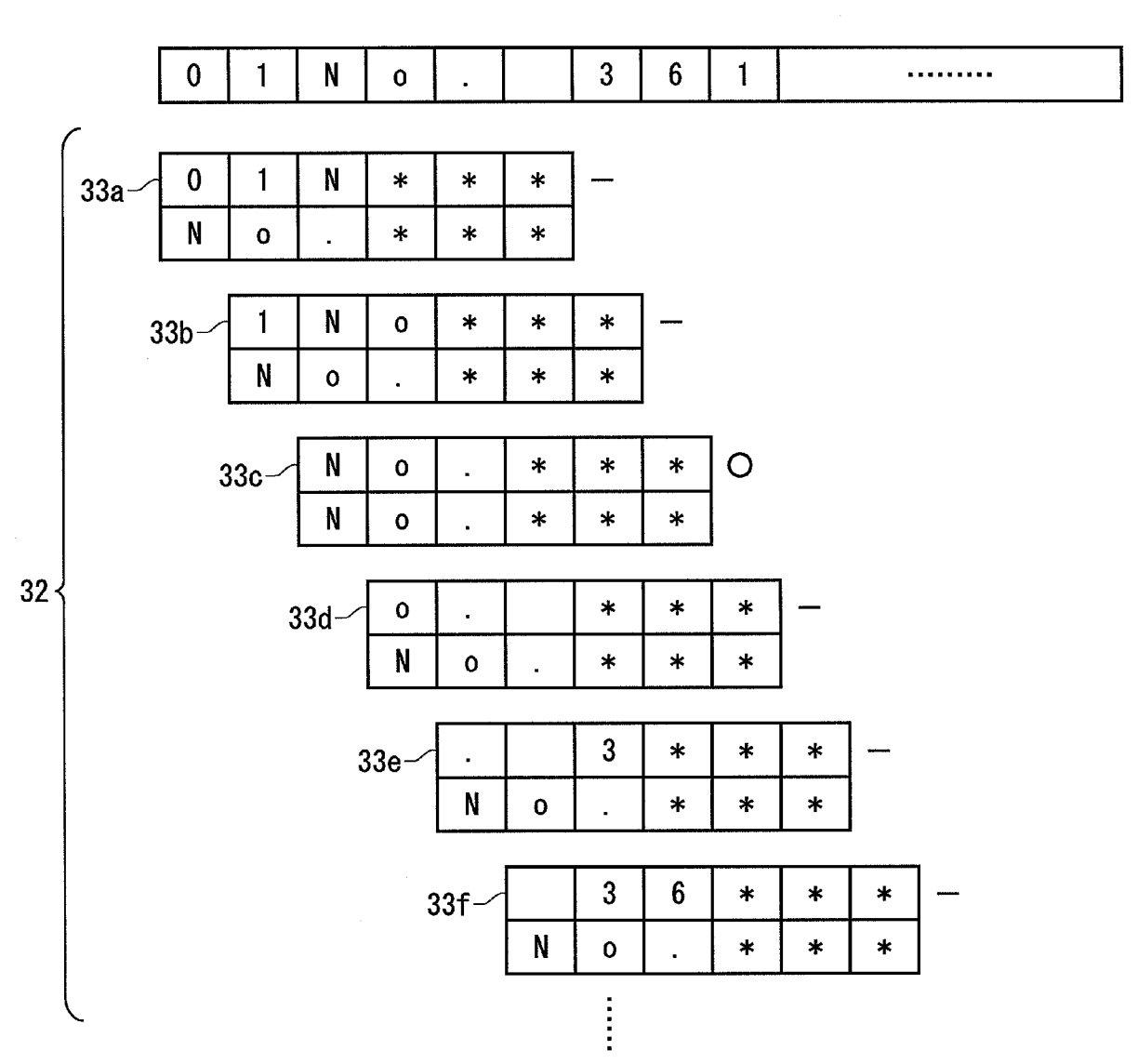

FIG. 6 shows another example of the position detection circuit. In the example shown in FIG. 6, when the data length of position identification data is shorter than that prepared in each of the comparison circuits 33a-33f in the position detection circuit 32, predetermined data, such as "00H" or "01H", is padded posterior to the position identification data. Similarly, with regard to communication data to be compared with position identification data, a data length identical with that of the position identification data is extracted from the communication data and input to a comparison circuit, and the same data as padded after the position identification data is also padded posterior thereto. In such case, the communication data may be copied as work, and the copied data may be processed to be input to the comparison circuits 33a-33f, so as not to change the original communication data. Thus, the position detection circuit 32 can be generally used regardless of the length of position identification data.

Figure 7:
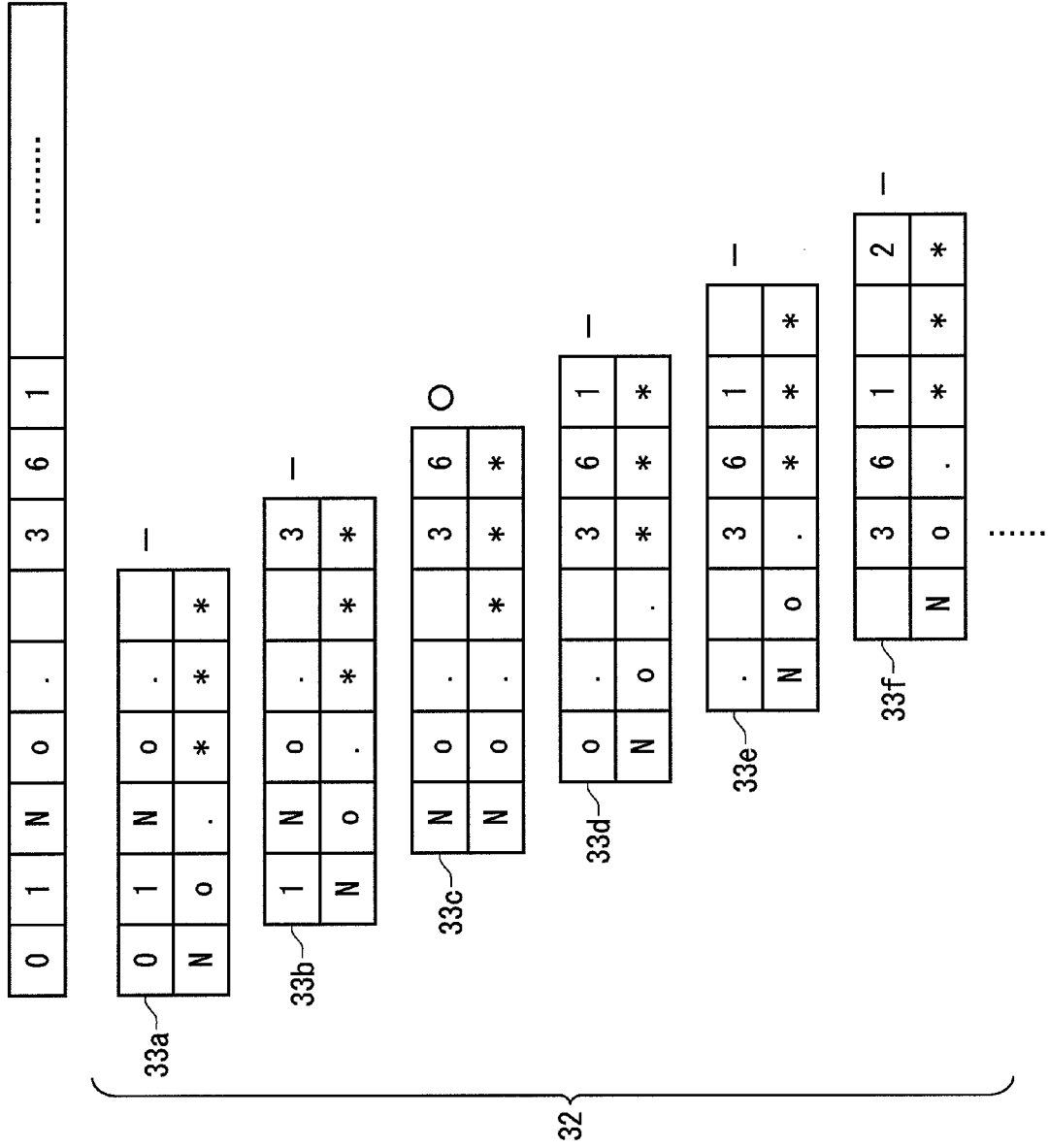
FIG. 7 is a diagram that shows yet another example of the position detection circuit.

FIG. 7 shows yet another example of the position detection circuit. In the example shown in FIG. 7, predetermined data is padded posterior to position identification data in the same way as shown in the example of FIG. 6, and, in addition, such data is regarded as a wild card. That is, when data is input as a wild card into the comparison circuits 33a-33f, it is determined that the corresponding part of target data to be compared matches the wild-card data whatever the target data is. Thus, the position detection circuit 32 can be generally used regardless of the length of position identification data.

Figure 8:
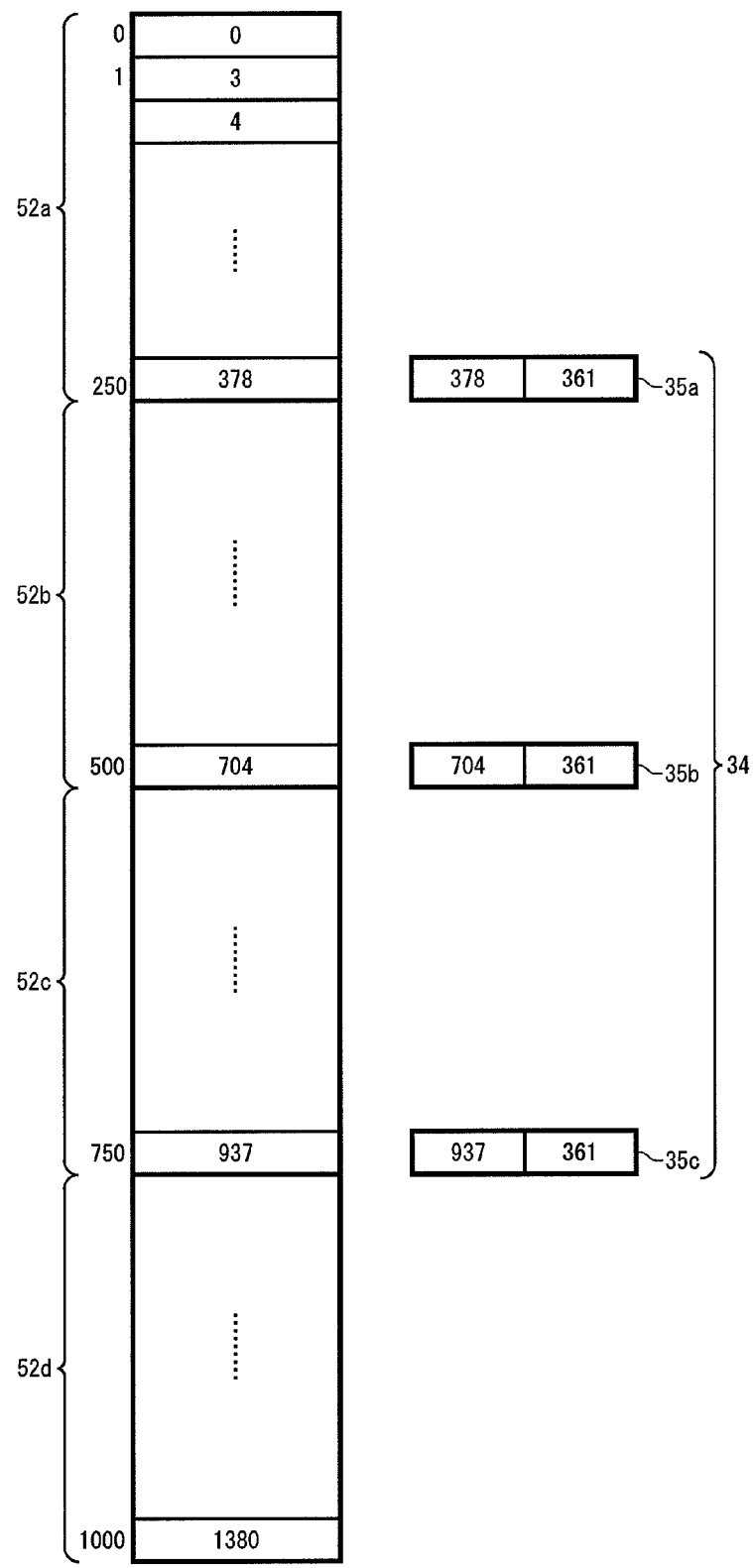
FIG. 8 is a diagram that shows an example of internal data of a first database.

FIG. 8 shows an example of internal data of the first database. The first database 50 stores reference data, which is referred to when processing on packets, such as filtering, routing, switching, or replacement, is determined. The pieces of reference data are sorted according to some sort conditions and stored in ascending or descending order. In the example of FIG. 8, 1000 pieces of reference data are stored.

The index circuit 34 determines which range comparison target data belongs to among three or more ranges, such as 52a-52d, into which reference data stored in the first database 50 is divided. In the example of FIG. 8, the 1000 pieces of reference data are divided into four ranges 52a-52d, i.e., 250 pieces each in a range. The index circuit 34 includes multiple comparison circuits 35a-35c, each of which compares a piece of reference data at the border of the range with the comparison target data. Since the comparison circuits 35a-35c simultaneously compare the pieces of reference data at the borders with the comparison target data in parallel, which range the comparison target data belongs to can be determined by a single operation of comparison processing.

The pieces of reference data at the borders to be input to the comparison circuits 35a-35c of the index circuit 34 may be set by an apparatus provided outside the communication control apparatus 10. Alternatively, reference data at predetermined positions in the first database 50 may be set in advance to be automatically input as such. In the latter case, even when the first database 50 is updated, the reference data at the predetermined positions in the first database 50 are automatically input to the comparison circuits 35a-35c. Therefore, the communication control processing can be performed immediately without initialization or the like.

As mentioned previously, CPU-based binary search cannot make multiple comparisons at the same time. In the communication control apparatus 10 of the base technology, in contrast, providing the multiple comparison circuits 35a-35c in parallel enables simultaneous parallel comparison processing, with a significant improvement in the search speed.

After the index circuit 34 determines the relevant range, the binary search circuit 36 performs search using a binary search method. The binary search circuit 36 divides the range determined by the index circuit 34 further into $2^n$ and subsequently compares the pieces of reference data lying at the borders with the comparison target data, thereby determining which range the comparison target data belongs to. The binary search circuit 36 includes multiple comparators for comparing, bit by bit, reference data with comparison target data. For example, in the base technology are provided 1024 comparators to perform bit matching on 1024 bits simultaneously. When the range to which the comparison target data belongs is determined among the $2^n$ split ranges, the determined range is further divided into $2^n$. Then, the pieces of reference data lying at the borders are read out to be compared with the comparison target data. Thereafter, this processing is repeated to narrow the range further until reference data that matches the comparison target data is eventually found.

The operation will now be described in more detail in conjunction with the foregoing example. Each of the comparison circuits 35a-35c of the index circuit 34 receives "361" as comparison target data. As for reference data, the comparison circuit 35a receives "378", which lies at the border of the ranges 52a and 52b. Similarly, the comparison circuit 35b receives reference data "704" lying at the border of the ranges 52b and 52c, and the comparison circuit 35c receives reference data "937" lying at the border of the ranges 52c and 52d. The comparison circuits 35a-35c then perform comparisons simultaneously, determining that the comparison target data "361" belongs to the range 52a. Subsequently, the binary search circuit 36 searches the reference data for the comparison target data "361".

Figure 9:
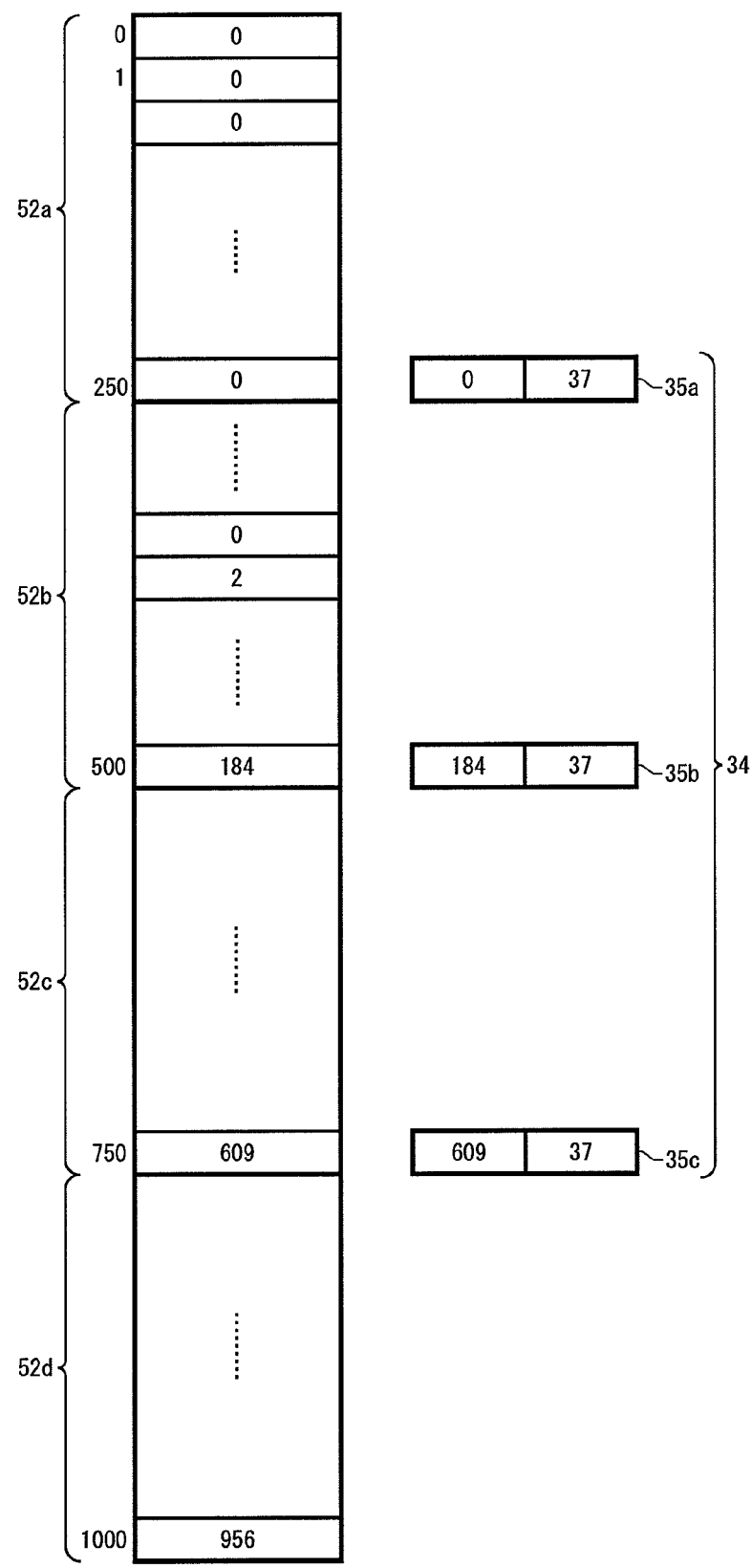
FIG. 9 is a diagram that shows another example of internal data of the first database.

FIG. 9 shows another example of internal data of the first database. In the example shown in FIG. 9, the number of pieces of reference data is smaller than the number of pieces of data storable in the first database 50, i.e., 1000 in this case. In such instance, the first database 50 stores the pieces of reference data in descending order, starting with the last data position therein. Then, 0 is stored in the rest of the data positions. The database is loaded with data not from the top but from the bottom of the loading area, and all the vacancies occurring in the front of the loading area, if any, are replaced with zero. Consequently, the database is fully loaded at any time, so that the search time necessary for binary search will be constant. Moreover, if the binary search circuit 36 reads reference data "0" during a search, the circuit can identify the range without making a comparison, as the comparison result is obvious, and can proceed to the next comparison. Consequently, the search speed can be improved.

In CPU-based software processing, the first database 50 stores pieces of reference data in ascending order, from the first data position therein. In the rest of data positions will be stored a maximum value or the like, and in such case, the skip of comparison processing as described above cannot be made during binary search. The comparison technique described above can be implemented by configuring the search circuit 30 with a dedicated hardware circuit.

Figure 10:
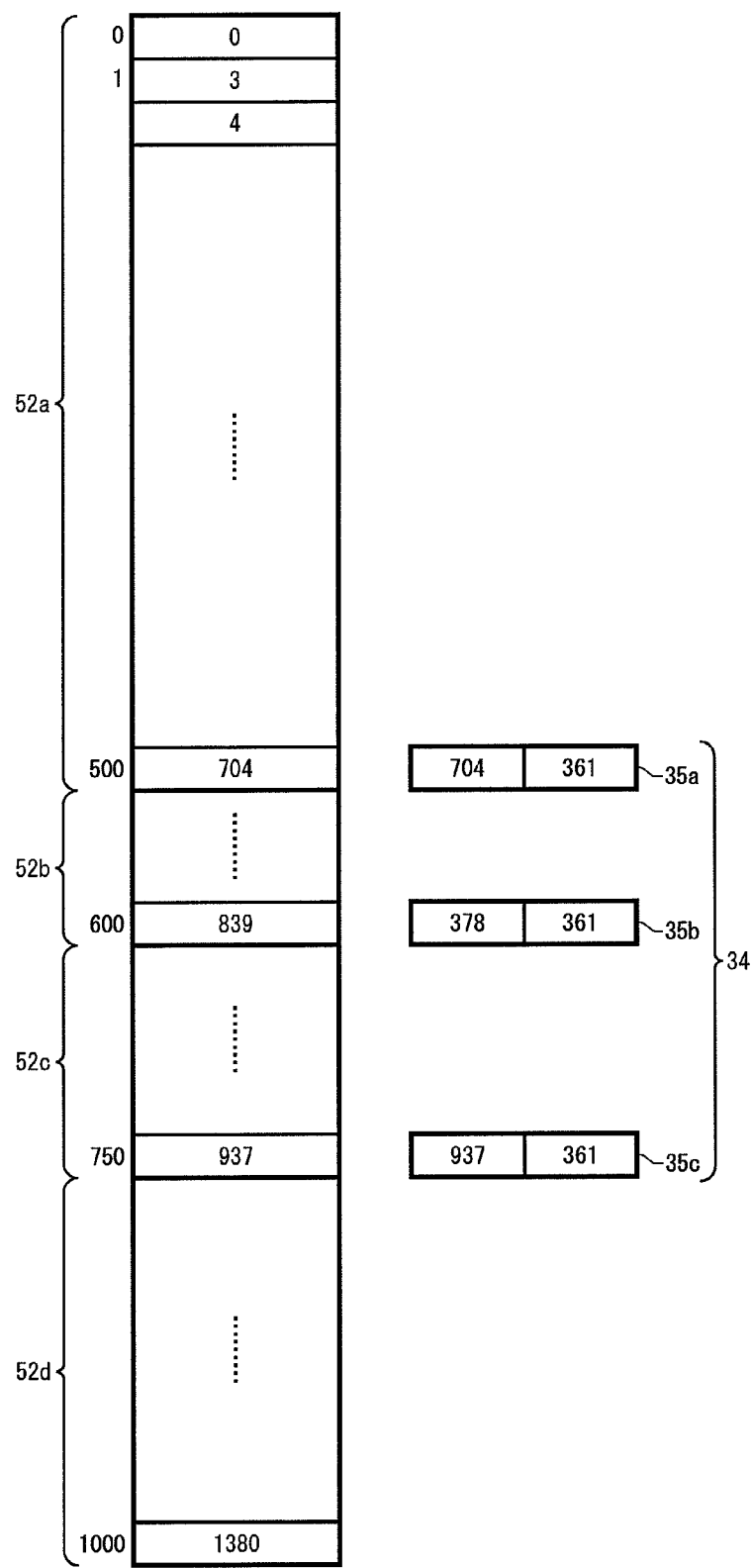
FIG. 10 is a diagram that shows yet another example of internal data of the first database.

FIG. 10 shows yet another example of internal data of the first database. In the example shown in FIG. 10, the reference data is not evenly divided into three or more ranges, but unevenly divided into ranges that accommodate different numbers of pieces of data, such as 500 pieces in the range 52a and 100 pieces in the range 52b. These ranges may be determined depending on the distribution of frequencies with which reference data occurs in communication data. Specifically, the ranges may be determined so that the sums of the frequencies of occurrence of reference data belonging to the respective ranges are almost the same. Accordingly, the search efficiency can be improved. The reference data to be input to the comparison circuits 35a-35c of the index circuit 34 may be modifiable from the outside. In such case, the ranges can be dynamically set, so that the search efficiency will be optimized.

Figure 11:
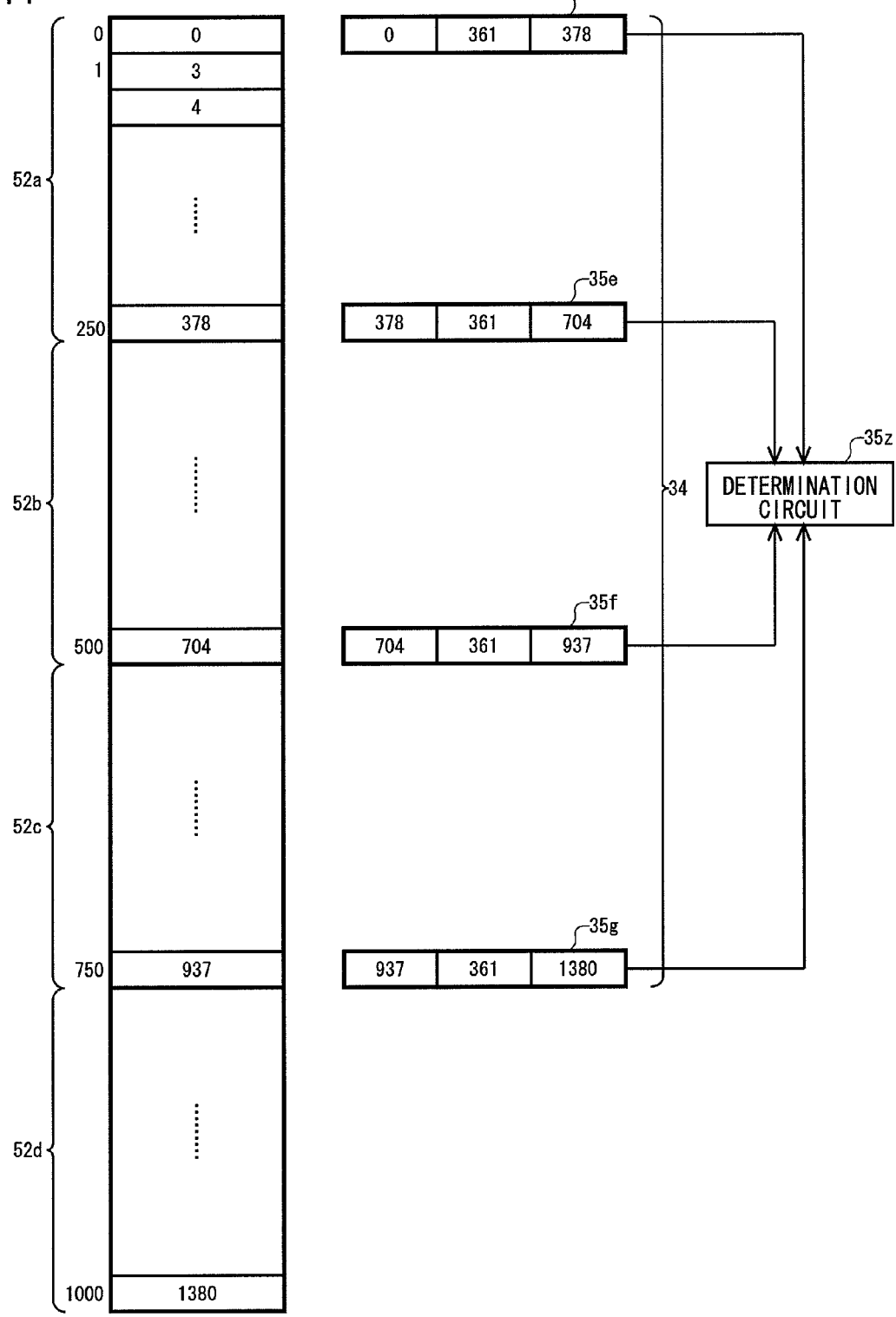
FIG. 11 is a diagram that shows another example of the index circuit.

FIG. 11 shows another example of the index circuit. In the examples of FIGS. 8-10, the index circuit 34 uses the three comparison circuits 35a-35c to determine which range comparison target data belongs to among the four ranges of 52a-52d in the first database 50. In the example shown in FIG. 11, on the other hand, the index circuit 34 is provided with four comparison circuits 35d-35g for determining whether or not comparison target data is included in each of the four ranges 52a-52d. For example, into the comparison circuit 35d are input the 0th and 250th pieces of reference data in the first database 50 and comparison target data. Then, each piece of the reference data is compared to the comparison target data, so as to determine whether or not the reference data is included in the range 52a. The comparison results provided by the comparison circuits 35d-35g are input into a determination circuit 35z, which outputs information providing which range the reference data is included in. Each of the comparison circuits 35d-35g may output a result indicating whether the reference data is included between the two input pieces of reference data, or may output a result indicating that the reference data is greater than the range, the reference data is included in the range, or the reference data is smaller than the range. When it is determined that the comparison target data is not included in any of the ranges 52a-52d, it can be found that the comparison target data does not exist within the first database 50. Accordingly, the search can be terminated without performing any further binary search.

Figure 12:
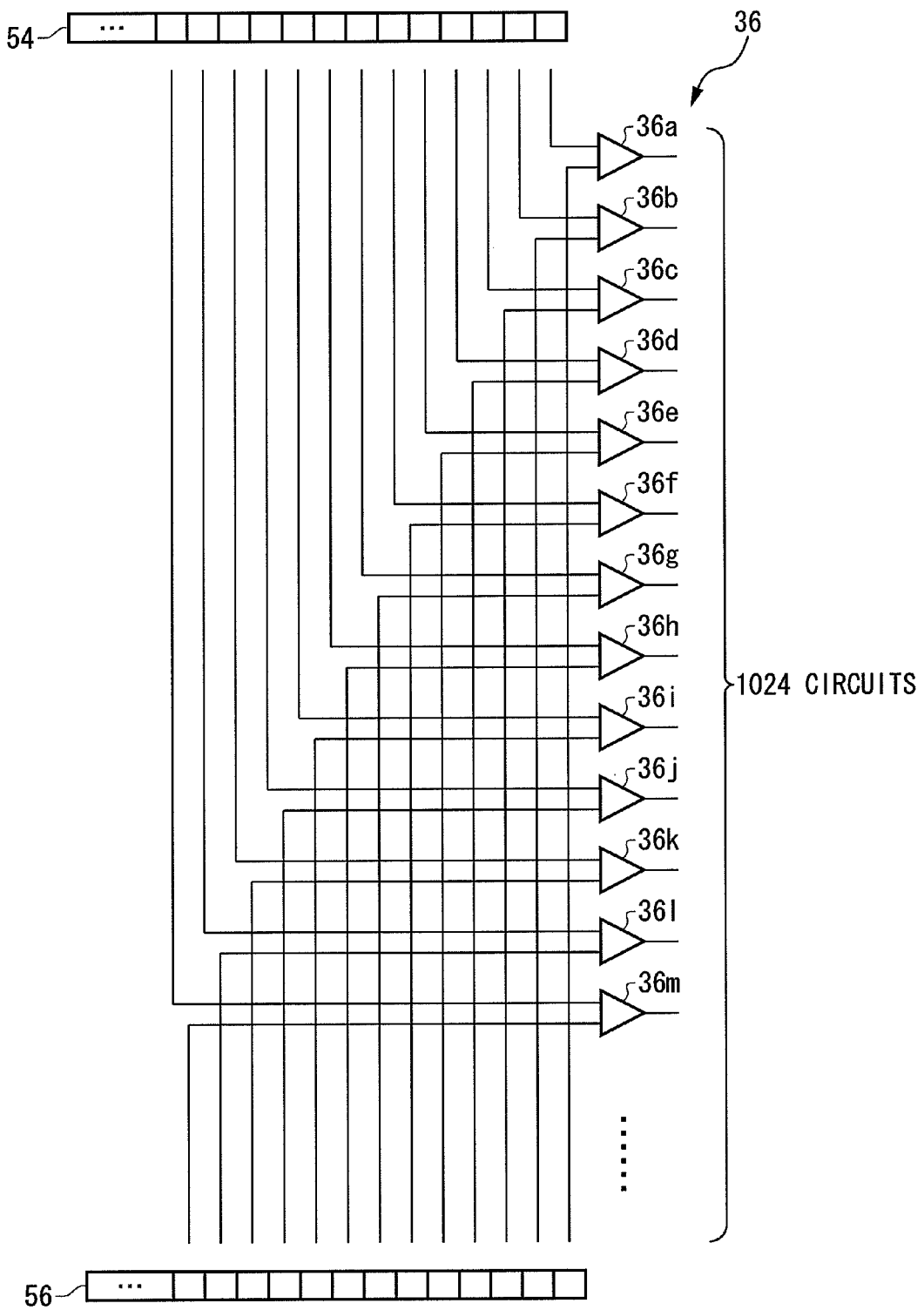
FIG. 12 is a diagram that shows a configuration of a comparison circuit included in a binary search circuit.

FIG. 12 shows a configuration of comparison circuits included in the binary search circuit. As mentioned previously, the comparison circuit in the binary search circuit 36 includes 1024 comparators, such as 36a, 36b, . . . . Each of the comparators 36a, 36b, etc. receives 1 bit of reference data 54 and 1 bit of comparison target data 56 to compare the bits in value. The comparison circuits 35a-35c of the index circuit 34 have similar internal configurations. Since the comparison processing is thus performed by a dedicated hardware circuit, a large number of comparison circuits can be operated in parallel to compare a large number of bits at a time, thereby speeding up the comparison processing.

Figure 13:
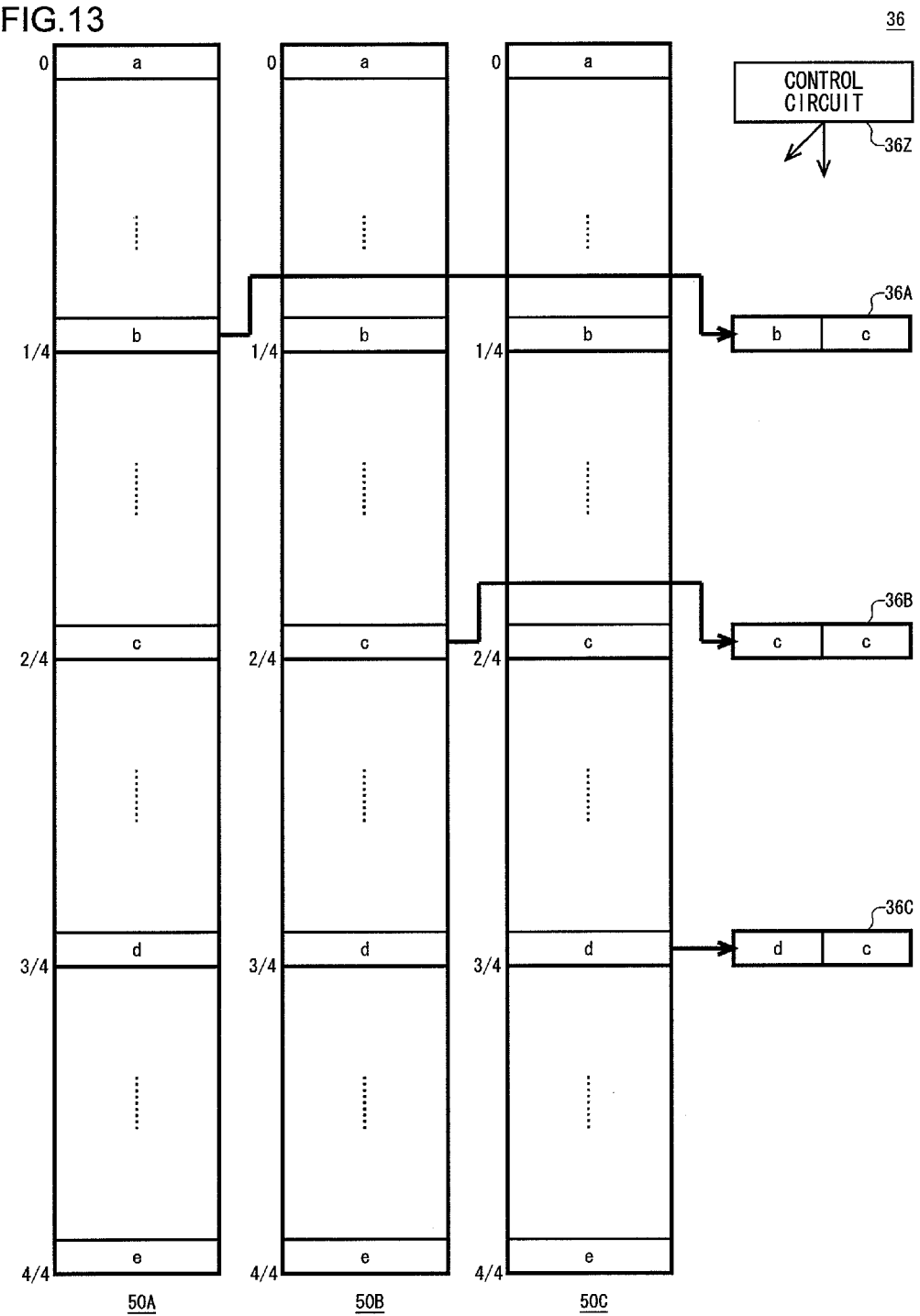
FIG. 13 is a diagram that shows a configuration of the binary search circuit.

FIG. 13 shows a configuration of the binary search circuit. The binary search circuit 36 includes comparison circuits 36A, 36B and 36C, each of which includes the 1024 comparators 36a, 36b, etc. as shown in FIG. 12, and a control circuit 36Z for controlling the comparison circuits.

In a conventional binary search method, a piece of data lying at the one-half position in the search range of a database, in which pieces of data are aligned in ascending or descending order, is read out to be compared with comparison target data in the first search. When the pieces of data are aligned in ascending order and if the comparison target data is smaller than the read out data, it means that the comparison target data might exist within the first half of the search range. Accordingly, in the second search, the search range is newly set to the first half and a piece of data lying at the one-half position in the range, i.e. at the one-quarter position in the original search range, is read out to be compared with the comparison target data. Conversely, if the comparison target data is greater than the read out data, it means that the comparison target data might exist within the second half of the search range. Accordingly, the new search range is set to the second half and a piece of data lying at the one-half position in the range, i.e. at the three-quarter position in the original search range, is read out to be compared with the comparison target data in the second search. In this way, the search range is narrowed by half repeatedly until the target data is reached.

In the base technology, in contrast, three comparison circuits are provided for binary search, so that when the data at the one-half position in the search range is compared with comparison target data for the first search, the comparison for the second search between the comparison target data and each of the pieces of data at the one-quarter and three-quarter positions in the search range can be simultaneously performed in parallel. Thus, the first and second searches can be performed at the same time, thereby reducing the time required to load the data from the database. Also, by operating three comparison circuits in parallel, the number of comparisons can be reduced by half, thereby reducing the search time.

In the example of FIG. 13, three comparison circuits are provided to perform two searches simultaneously. When n searches are to be performed simultaneously, $2^n-1$ comparison circuits may be generally provided. The control circuit 36Z inputs each piece of data at the $1/2^n$, $2/2^n$, . . . , and $(2^n-1)/2^n$ positions in the search range into the $2^n-1$ comparison circuits respectively, and operates the comparison circuits simultaneously in parallel to allow them to compare the respective pieces of data with comparison target data. The control circuit 36Z then acquires the comparison results from the comparison circuits and determines if the comparison target data is found. If any of the comparison circuits output a signal indicating that there has been a data match, the control circuit 36Z will determine that the comparison target data has been found and will terminate the binary search. If there is no such signal output, the process will be shifted to the next search. If the comparison target data exists within the database, the data must lie within a range between points where the comparison results of the $2^n-1$ comparison circuits change. In the case where 15 comparison circuits are provided, for example, if the piece of data at the 5/16 position is smaller than comparison target data and if the piece of data at the 6/16 position is greater than the comparison target data, the comparison target data should lie within the range between the 5/16 and 6/16 positions. Thus, the control circuit 36Z acquires comparison results from the comparison circuits and sets the next search range to a range between points where the comparison results change. The control circuit 36Z then inputs, into the respective comparison circuits, each piece of data at the $1/2^n$, $2/2^n$, ..., and $(2^n-1)/2^n$ positions in the next search range thus set.

There are provided the three first databases 50 in the base technology; the first database 50A is connected to the comparison circuit 36A and supplies thereto a piece of data at the one-quarter position in the search range; the first database 50B is connected to the comparison circuit 36B and supplies thereto a piece of data at the two-quarter position in the search range; and the first database 50C is connected to the comparison circuit 36C and supplies thereto a piece of data at the three-quarter position in the search range. Therefore, pieces of data can be loaded simultaneously into the comparison circuits in parallel, thereby further reducing the time for data loading and enabling high-speed binary search.

Providing more comparison circuits will improve the search speed. In consideration of cost or size of the system, a sufficient number of comparison circuits may be provided to achieve a desired search speed. Also, although it is desirable that first databases as many as comparison circuits are provided, some comparison circuits may share a database in consideration of cost or size of the system.

FIG. 14 shows still yet another example of internal data of the first database. The first database 50 shown in FIG. 14 stores URLs of contents to which filtering is applied. The data stored in the first database 50 may include predetermined data recognized as a wild card, such as "00H" or "01H". In the example shown in FIG. 14, "*******" is recognized as a wild card in "http://www.xx.xx/*******", and, whatever the comparison target data corresponding thereto is, it is determined in the comparators 36a, 36b, etc. that such data matches the wild card. Accordingly, every character string starting with "http://www.xx.xx/" is detected by the binary search circuit 36. Consequently, processing such as applying filtering to all contents within the domain "http://www.xx.xx/" can be easily performed.

FIG. 15 shows an example of internal data of the second database. The second database 60 includes a search result field 62, which contains a search result of the search circuit 30, and a processing content field 64, which contains a processing content to be performed on communication data. The database stores the search results and the processing contents related to each other. In the example of FIG. 15, conditions are established such that a packet will be allowed to pass if its communication data contains reference data; if not, the packet will be discarded. The process execution circuit 40 searches the second database 60 for a processing content based on the search result and performs the processing on the communication data. The process execution circuit 40 may also be configured with a wired logic circuit.

FIG. 16 shows another example of internal data of the second database. In the example of FIG. 16, the processing content is set for each piece of reference data. With regard to packet replacement, replacement data may be stored in the second database 60. As for packet routing or switching, information on the route may be stored in the second database 60. The process execution circuit 40 performs processing, such as filtering, routing, switching, or replacement, which is specified in the second database 60, in accordance with the search result of the search circuit 30. When the processing content is set for each piece of reference data, as shown in FIG. 16, the first database 50 and the second database 60 may be merged with each other.

The first database and the second database are configured to be rewritable from the outside. By replacing these databases, various types of data processing and communication control can be achieved using the same communication control apparatus 10. Also, multistage search processing may be performed by providing two or more databases that store reference data to be searched. In such instance, more complicated conditional branching may be performed by providing two or more databases that store search results and processing contents related to each other. When multiple databases are thus provided to conduct multistage search, a plurality of the position detection circuits 32, the index circuits 34, the binary search circuits 36, etc. may also be provided.

The data intended for the foregoing comparison may be compressed by the same compression logic. If both the source data and the target data to be compared are compressed by the same method, the comparison can be performed in the same manner as usual, thus reducing the amount of data to be loaded for comparison. The smaller amount of data to be loaded can reduce the time required to read out the data from the memory, thereby reducing the overall processing time. Moreover, the number of comparators can be also reduced, which contributes to the miniaturization, weight saving, and cost reduction of the apparatus. The data intended for comparison may be stored in a compressed form, or may be read out from the memory and compressed before comparison.

Figure 17:
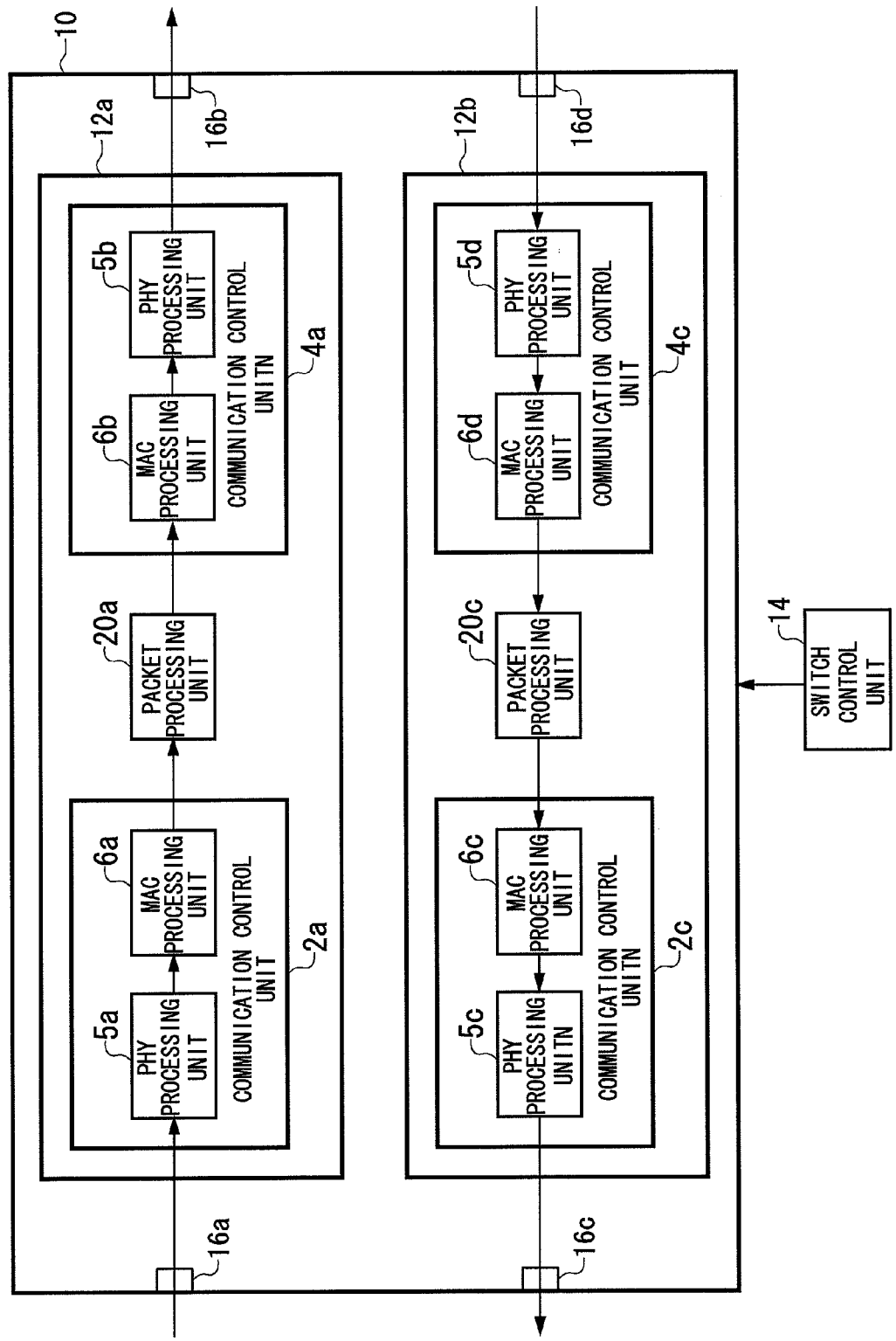
FIG. 17 is a diagram that shows another illustrative configuration of the communication control apparatus according to the base technology.

FIG. 17 shows another illustrative configuration of the communication control apparatus in the base technology. The communication control apparatus 10 shown in this diagram has two communication control units 12, each of which has the same configuration as the communication control apparatus 10 shown in FIG. 4. There is also provided a switch control unit 14 for controlling the operation of the individual communication control units 12. Each of the communication control units 12 has two input/output interfaces 16 and is connected to two networks, upstream and downstream, via the respective input/output interfaces 16. The communication control units 12 receive communication data from either one of the networks and output processed data to the other. The switch control unit 14 switches the inputs and outputs of the input/output interfaces 16 provided for the individual communication control units 12, thereby switching the directions of the flow of communication data in the communication control units 12. This allows communication control not only in one direction but also in both directions.

The switch control unit 14 may provide control such that: either one of the communication control units 12 processes inbound packets and the other processes outbound packets; both the units process inbound packets; or both the units process outbound packets. Consequently, the directions of communications to control can be changed depending on, for example, the traffic status or intended purpose.

The switch control unit 14 may acquire the operating state of the respective communication control units 12 and may switch the direction of communication control according thereto. For example, when one of the communication control units 12 is in a standby state and the other communication control unit 12 is in operation, the unit on standby may be activated as a substitute upon detection of the unit in operation stopping due to a failure or other reasons. This can improve the fault tolerance of the communication control apparatus 10. Also when one of the communication control units 12 needs maintenance such as a database update, the other communication control unit 12 may be operated as a substitute. Thus, appropriate maintenance can be performed without halting the operation of the communication control apparatus 10.

The communication control apparatus 10 may be provided with three or more communication control units 12. The switch control unit 14 may, for example, acquire the traffic status to control the direction of communications in the respective communication control units 12 so that more communication control units 12 are allocated for communication control processing in a direction handling higher traffic. This minimizes a drop in the communication speed, even when the traffic increases in one direction.

Figure 18:
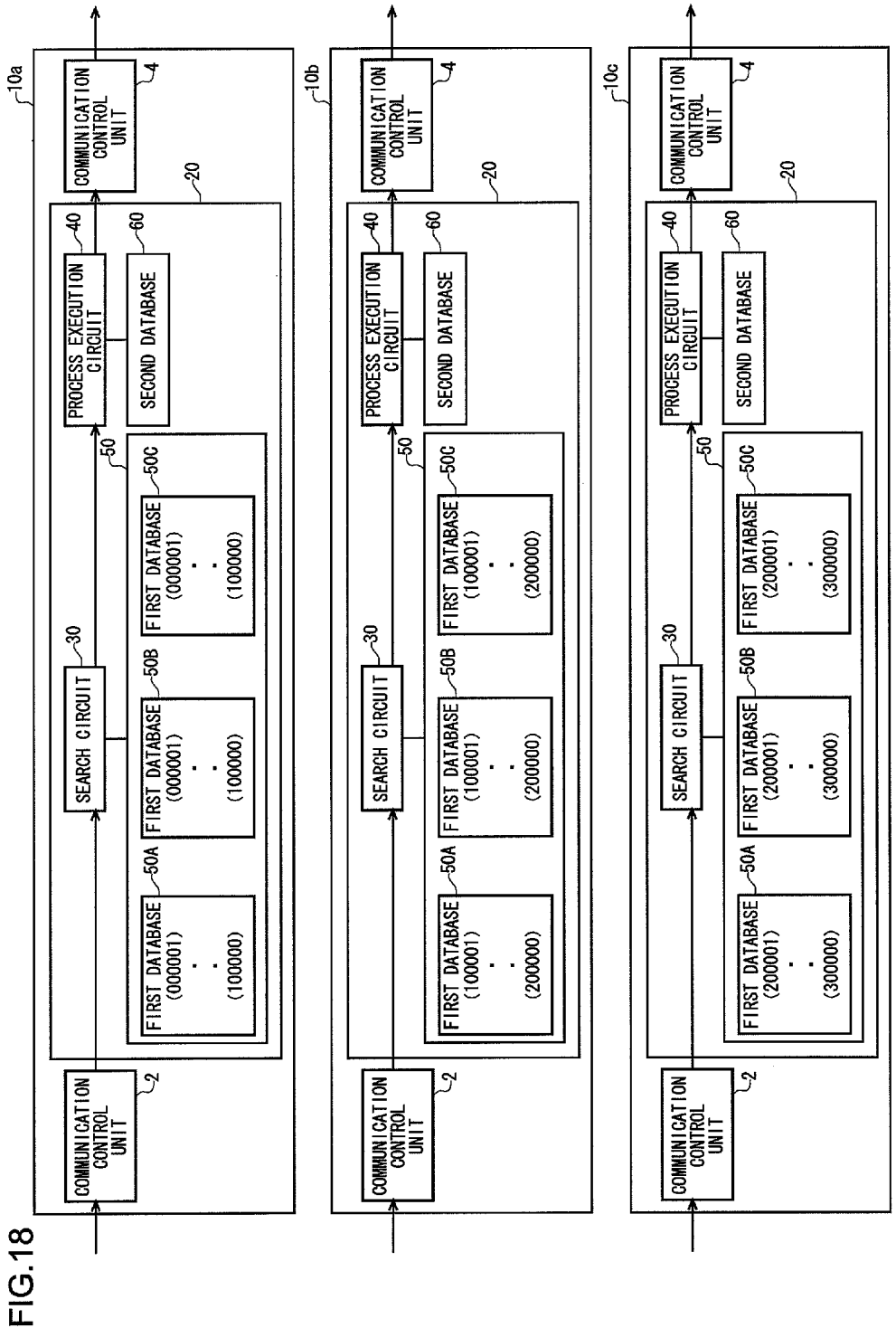
FIG. 18 is a diagram that shows a configuration of a communication control apparatus comprising multiple communication control apparatuses.

FIG. 18 shows a configuration of a communication control apparatus 10 comprising multiple communication control apparatuses 10a, 10b, 10c, etc. Since the first database 50 requires larger capacity in proportion to an increasing number of pieces of data, the database is divided into portions to be stored by the communication control apparatuses 10a, 10b, 10c, etc. As will be discussed later, in the communication control system 100 of the base technology, a communication packet to be processed is sent to all the communication control apparatuses 10a, 10b, 10c, etc. in operation, and each of the communication control apparatuses 10 then receives and processes the packet. For example, the communication control apparatus 10a stores data with data IDs "000001"-"100000", the communication control apparatus 10b stores data with data IDs "100001"-"200000", and the communication control apparatus 10c stores data with data IDs "200001"-"300000"; each of the communication control apparatuses refers to the respective data to process a packet.

FIG. 19 shows an example of internal data of a management table 111 provided in the operation monitoring server 110. The management table 111 includes apparatus ID fields 112, operating state fields 113 and data ID fields 114. The apparatus ID fields 112 contain the apparatus IDs of the communication control apparatuses 10a, 10b, etc. The operating state fields 113 contain the operating state of the communication control apparatuses, and the data ID fields 114 contain the ranges of data IDs handled by the communication control apparatuses. The operating state appears as "operating", "standby", "failure", "data updating", etc. The operating state fields 113 are updated by the operation monitoring server 110 each time the operating state of the communication control apparatuses 10a, 10b, etc. changes. In the example shown in FIG. 19, "465183" pieces of data are stored in the first database 50, so that the five communication control apparatuses 10 having the apparatus IDs "1"-"5" are in operation while the communication control apparatus 10 having the apparatus ID "6" is in a standby state.

The operation monitoring server 110 monitors the operating state of multiple communication control apparatuses 10. When detecting any of the communication control apparatuses 10 being inoperable because of some trouble, the operation monitoring server 110 stores, in the communication control apparatus 10 on standby, the same data as stored in the inoperable apparatus, and places the standby communication control apparatus 10 in operation. For example, when the communication control apparatus 10 with the apparatus ID "2" halts the operation because of a failure, as shown in FIG. 20, the communication control apparatus 10 with the apparatus ID "6", which has been on standby, stores the data with data IDs "100001-200000" and starts operating. Thus, even if a communication control apparatus 10 stops because of some trouble, the main operation will be continued properly. The communication control apparatus 10 on standby may store any of the data in advance to be made in a hot standby state, or may be in a cold standby state.

Next, the procedure for updating databases stored in the communication control apparatuses 10 will be described. The database server 150 acquires the latest database from an external database at a certain time and retains it therein. In order to reflect, in a communication control apparatus 10, the latest database retained in the database server 150, the operation monitoring server 110 transfers the data from the database server 150 and stores it in the communication control apparatus 10 at a certain time.

FIGS. 21A, 21B and 21C are diagrams for describing the procedure for updating databases. As with FIG. 19, FIG. 21A shows that the communication control apparatuses 10 with the apparatus IDs "1"-"5" are in operation while the communication control apparatus 10 with the apparatus ID "6" is on standby. At the time when a database is to be updated, the operation monitoring server 110 identifies the communication control apparatus 10 in a standby state then and instructs the database server 150 to store the data in the communication control apparatus 10. In the example shown in FIG. 21A, the communication control apparatus 10 with the apparatus ID "6" is on standby, so that the database server 150 stores the data in that apparatus. The operation monitoring server 110 then changes the operating state field 113 for the apparatus ID "6" to "data updating".

FIG. 21B shows a state where a database of a communication control apparatus 10 is being updated. The database server 150 stores, in the first database 50 in the communication control apparatus 10 with the apparatus ID "6" on standby, the data handled by one of the communication control apparatuses 10 in operation. In the example shown in FIG. 21B, the data with data IDs "000001-100000", which have been handled by the communication control apparatus 10 with the apparatus ID "1", are stored in the communication control apparatus 10 with the apparatus ID "6".

FIG. 21C shows a state where the communication control apparatus 10 with the apparatus ID "6" has had its database updated and is placed in operation, and the communication control apparatus 10 with the apparatus ID "1" is placed into a standby state instead. Upon completion of storing data in the communication control apparatus 10 with the apparatus ID "6", the operation monitoring server 110 starts the operation of the apparatus, which stores the updated database. The operation monitoring server 110 also stops the operation of the communication control apparatus 10 with the apparatus ID "1", which stores the database before update, to place the apparatus into a standby state. Thus, the communication control apparatus 10 with an updated database is placed in operation. Then, the data with data IDs "100001-200000" are stored in the communication control apparatus 10 with the apparatus ID "1" before the apparatus is placed in operation, and, subsequently, the operation of the communication control apparatus 10 with the apparatus ID "2" is stopped. Thereafter, databases are similarly updated by turns, so that the databases of all the communication control apparatuses 10 can be updated behind the actual operation, without halting the operation of the communication control system 100.

In this way, data stored in each of the communication control apparatuses 10 is not fixed in the base technology, and hence, the communication control apparatus 10 that stores certain data changes with time. If, before a packet is sent to each of the communication control apparatuses 10, the process of determining which communication control apparatus 10 stores the data of the user is performed, the time for the process will be additionally required. Accordingly, in the present embodiment, a received packet is provided to all the communication control apparatuses 10, and each of the apparatuses then processes the packet. In the following, a technique for providing such mechanism will be described.

Figure 22:
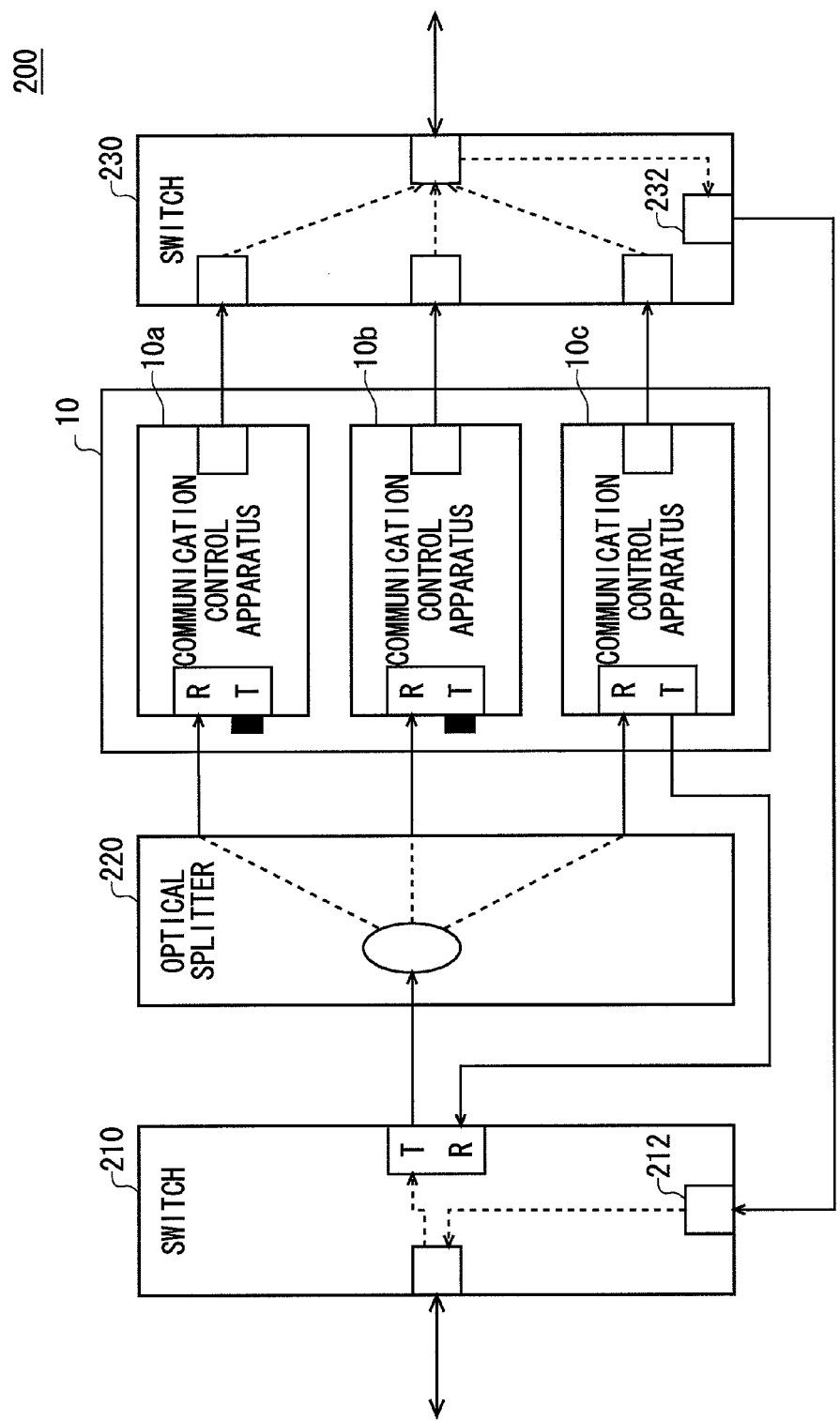
FIG. 22 is a diagram that shows a configuration of a communication path control apparatus provided to process packets with multiple communication control apparatuses.

FIG. 22 shows a configuration of a communication path control apparatus provided to process packets with multiple communication control apparatuses 10. A communication path control apparatus 200 comprises a switch 210, an optical splitter 220, which is an example of a data supply unit, and a switch 230. The switch 210 transmits a received packet to the communication control apparatuses 10. Between the switch 210 and the communication control apparatuses 10, there is provided the optical splitter 220 that provides the packet to the multiple communication control apparatuses 10a, 10b and 10c in parallel. The switch 210 practically transmits a packet to the optical splitter 220, which transmits the packet to each of the communication control apparatuses in parallel.

If a packet is converted to a broadcast packet so as to be transmitted to the multiple communication control apparatuses 10a, 10b and 10c, additional process such as adding a time stamp to the header will be required, which reduces the processing speed. Therefore, a packet is not converted but split by the optical splitter 220 so as to be transmitted as a unicast packet to the multiple communication control apparatuses 10a, 10b and 10c. This method will be called "parallelcast" in the present specification.

Each of the communication control apparatuses is not set to a mode in which an apparatus receives only packets directed to the MAC address of the apparatus, but set to promiscuous mode in which an apparatus receives all packets regardless of the destination MAC addresses. When receiving a packet sent via parallelcast from the optical splitter 220, each of the communication control apparatuses omits MAC address matching and acquires every packet to process it.

If a packet needs to be returned to the transmission source because, for example, the communication thereof has been prohibited, the communication control apparatus 10c will transmit a response packet to the switch 210 bypassing the optical splitter 220. If the communication control apparatus 10c processes the packet and the communication thereof is permitted, the communication control apparatus 10c will transmit the packet to a network. Between the communication control apparatuses 10 and the upstream communication line, there is provided the switch 230 by which packets transmitted from the multiple communication control apparatuses 10a, 10b and 10c are aggregated. The communication control apparatus 10c will practically transmit the packet to the switch 230, which transmits the packet to the upstream communication line.

When the switch 230 receives a return packet transmitted from the destination of packet transmission and if the return packet need not be processed by the communication control apparatuses 10, the packet will be transmitted from the port 232 of the switch 230 to the port 212 of the switch 210, and then transmitted therefrom to the transmission source. On the Internet, the transmission path is generally recorded in the packet to ensure the return path through which a response packet sent in return for the packet can be certainly delivered to the transmission source. In the present embodiment, however, since the return path is already provided within the communication path control apparatus 200, communication can be performed between apparatuses without recording the path or processing the packet. Consequently, unnecessary process can be eliminated, thereby improving the processing speed.

The example in FIG. 22 shows the case where only a packet transmitted from a transmission source to a transmission destination is processed, but a return packet transmitted from the transmission destination to the transmission source is made to pass through without being processed. Alternatively, the communication path control apparatus 200 may be configured so that the communication control apparatuses 10 process packets transmitted in both directions. In such case, the optical splitters 220 may be provided on both sides of the communication control apparatuses 10. Also, the bypass path from the switch 230 to switch 210 need not be provided.

In such way, by sending a packet via parallelcast to all the communication control apparatuses, the packet can be appropriately processed by the proper communication control apparatus among the multiple communication control apparatuses, without the need to specify, in advance, a communication control apparatus by which the packet is to be processed.

Since these communication control apparatuses receive all packets sent via parallelcast from the communication path control apparatus 200 to process or discard them, as stated previously, the apparatuses need not be provided with IP addresses, which uniquely identify apparatuses on the Internet. If the packet processing as discussed above is performed by server apparatuses or the likes, it will be necessary to consider attacks to the server apparatuses. However, since the communication control apparatuses of the present embodiment cannot be directly attacked by malicious third parties via the Internet, communication control can be performed securely.

First Embodiment

Figure 23:
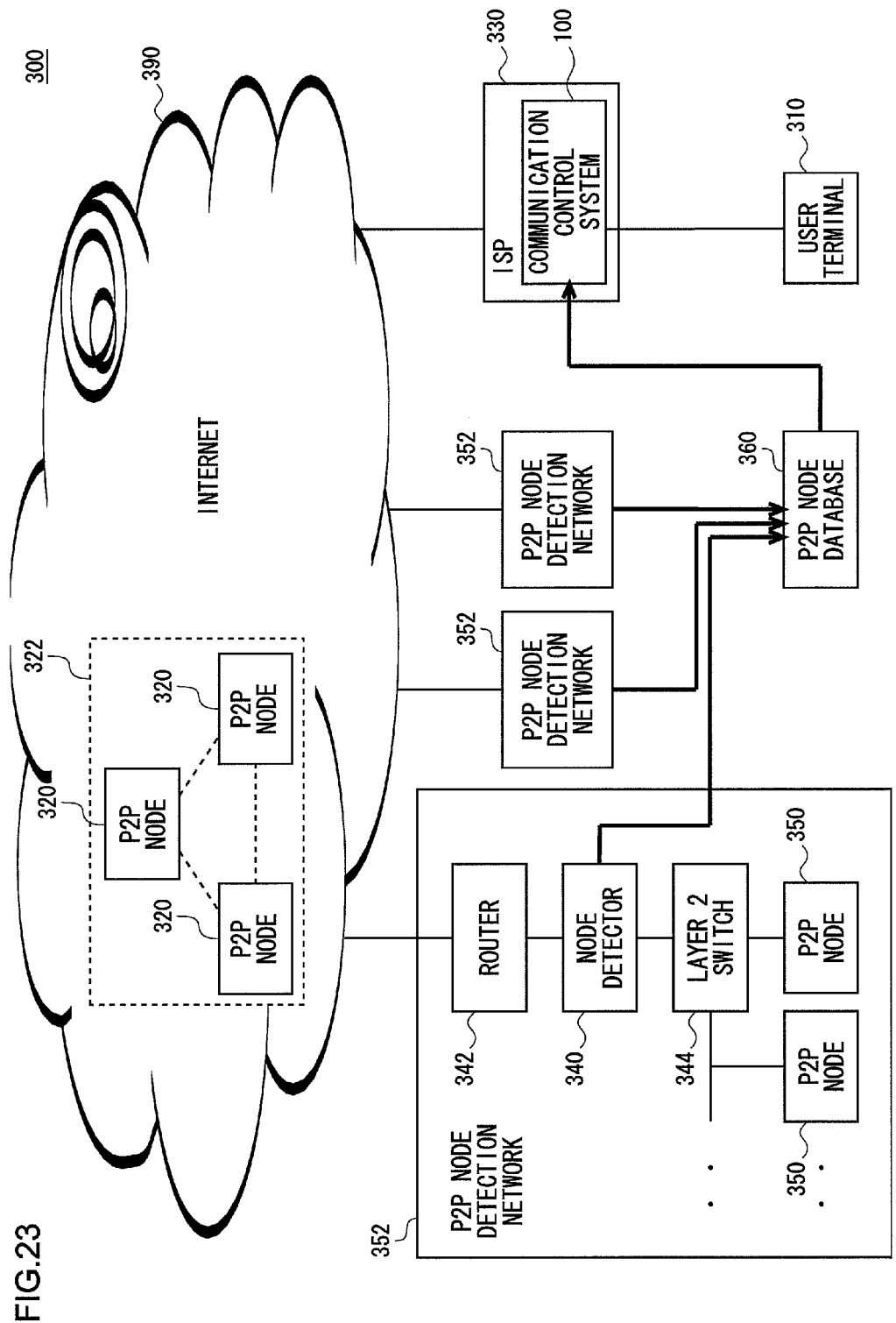
FIG. 23 is a diagram that shows a configuration of a communication management system according to a first embodiment.

FIG. 23 shows a configuration of a communication management system according to the first embodiment. A communication management system 300 manages P2P communication, such as blocking or subordinating inappropriate communication between P2P nodes 320, using the communication control system 100 having a packet filtering function, etc.

A user terminal 310, such as a personal computer, generally connects to an Internet service provider (hereinafter, described as "ISP") 330 via a public telephone network, a cellular phone network, a LAN or a WAN (not illustrated), and connects to the Internet 390 via the ISP 330. The P2P nodes 320, which execute P2P applications including file-sharing software, have P2P connections between each other, forming a P2P network 322. The "P2P node 320" includes an apparatus functioning as a server or a host providing a file search function, etc. in a file-sharing application.

In a server-client model, a server stores information while a client acquires information by connecting to the server via the Internet. Accordingly, when distribution of an illegal content is detected, only the server providing the content need be found and stopped. In the P2P network 322, however, since direct communication is conducted between P2P nodes 320, distribution of an illegal content therein is difficult to detect; even such distribution can be detected, again it is difficult to identify the P2P node 320 that provides the illegal content.

Also, in the case where a file is directly sought among P2P nodes 320 by inquiring for the file, without a file search server for file sharing being not provided in the P2P network 322, communications will increase at an accelerated pace along with an increasing number of P2P nodes 320. Accordingly, network congestion may occur, thereby possibly affecting another user terminal 310 using the ISP 330.

In addition, since a P2P node 320 directly communicates with another P2P node 320 in the P2P network 322, the network is vulnerable to attacks from malicious P2P nodes 320 and could be a breeding ground for spreading viruses. Consequently, users ignorant of or indifferent to computer security use file-sharing applications and get infected with viruses, thereby causing social problems including leakage of important information.

Under such circumstances, appropriate techniques for managing P2P communication have been strongly desired, but it has been difficult to regulate data transmission between P2P nodes 320. The present embodiment proposes a technique for detecting a P2P node 320 and performing appropriate filtering on the communication with the P2P node 320 thus detected. This technique is expected to solve the aforementioned problems, so that the social contribution of the present invention may be considered remarkable.

In the present embodiment, the communication control system 100 described in the base technology is provided between the user terminal 310 and a P2P node 320 in the P2P network 322, as shown in FIG. 23. Also, there is provided a P2P node detection network 352 for detecting an IP address, etc. of a P2P node 320; the network is used to notify the communication control system 100 of identification information including the IP address of a P2P node 320 detected by a node detector 340 so as to detect communication with the P2P node 320. The communication control system 100 may be provided at any position in a network, and FIG. 23 shows an example in which an ISP 330 possesses the communication control system 100. Since most P2P nodes 320 connect to the Internet 390 via an ISP 330, P2P communication can be managed more reliably if each ISP 330 employs the communication control system 100.

A P2P node 350 connects to the Internet 390 via a layer 2 switch 344 and a router 342, and executes a P2P application to have a P2P connection with a P2P node 320 for communication. The node detector 340 is provided between a P2P node 350 and the P2P network 322, and acquires and analyzes a communication packet transmitted between a P2P node 350 and a P2P node 320 in the P2P network 322 so as to detect identification information including the IP address and the TCP/UDP port number of the P2P node 320. The node detector 340 does not record the party on the other side of communication when the application used there is other than a P2P application executed by a P2P node 350, such as one for inquiry to a DNS, and only detects and records the party on the other side of communication using a P2P application. The node detector 340 analyzes a packet transmitted from or to a P2P node 350, but makes the packet pass through without performing filtering thereon as the detector is layer 2 transparent. The node detector 340 shown in FIG. 23 may also be provided as a router-type apparatus besides such layer 2 transparent type. In such case, the node detector 340 performs routing as if it were a common router-type apparatus, but also detects and records the party on the other side of communication using a P2P application. The IP address and TCP/UDP port number of a P2P node 320 detected by the node detector 340 are registered in a P2P node database 360. The data registered in the P2P node database 360 is reflected in the first database 50 of the communication control apparatus 10 at a certain time by the database server 150 of the communication control system 100, as described in the base technology.

The communication control apparatus 10 searches the first database 50 for the IP address and TCP/UDP port number of the transmission source or transmission destination of a packet passing through the ISP 330, using the index circuit 34 and binary search circuit 36. If the IP address and TCP/UDP port number are registered in the first database 50, it means that the packet results from P2P communication with a P2P node 320. Accordingly, the process execution circuit 40 will discard the packet to block the P2P communication thereof, or will delay the transmission of the packet to subordinate it to other communications. If the IP address and TCP/UDP port number are not registered in the first database 50, on the other hand, the packet is found to be not from P2P communication, so that the process execution circuit 40 will transmit the packet to the network without discarding it. Thus, P2P communication can be detected and restrained.

In the example above, the node detector 340 detects and obtains the IP address and TCP/UDP port number of a P2P node 320. If another protocol is used in P2P communication, another identification information of a P2P node 320, with which the P2P communication can be detected, may be obtained depending on the protocol.

When the user terminal 310 newly activates a P2P application and communicates with a P2P node 350, the node detector 340 detects the IP address and TCP/UDP port number of the P2P node, which are registered in the P2P node database 360 thereafter. Therefore, if the time intervals at which the P2P node database 360 is reflected in the communication control system 100 are shortened, the control of P2P communication with a new P2P node 320 can be started in a short time after the first communication with the P2P node 320.

When P2P communication is once conducted with a P2P node 320 and the P2P node 320 is registered in the P2P node database 360, but if there is no P2P communication with the P2P node 320 in a long time thereafter, the P2P node 320 may be deleted from the P2P node database 360. For example, in the case where a user uninstalls a P2P application from a user terminal 310 and uses the port number that has been used in communications of the P2P application for another communication, the communication using the port number will be restrained even if it is not P2P communication because the port number is registered together with an IP address in the P2P node database 360. Accordingly, the dates and times when P2P nodes 320 are detected last time may be recorded in the P2P node database 360, and when a P2P node 320 has not been detected for a certain period of time after the date and time of its last detection, the information on the P2P node 320 may be deleted from the P2P node database 360. If the user terminal 310 restarts P2P communication with the P2P node, the P2P node will be detected by the node detector 340 and registered in the P2P node database 360 again, so that P2P communication with the node will be blocked or subordinated.

Figure 24:
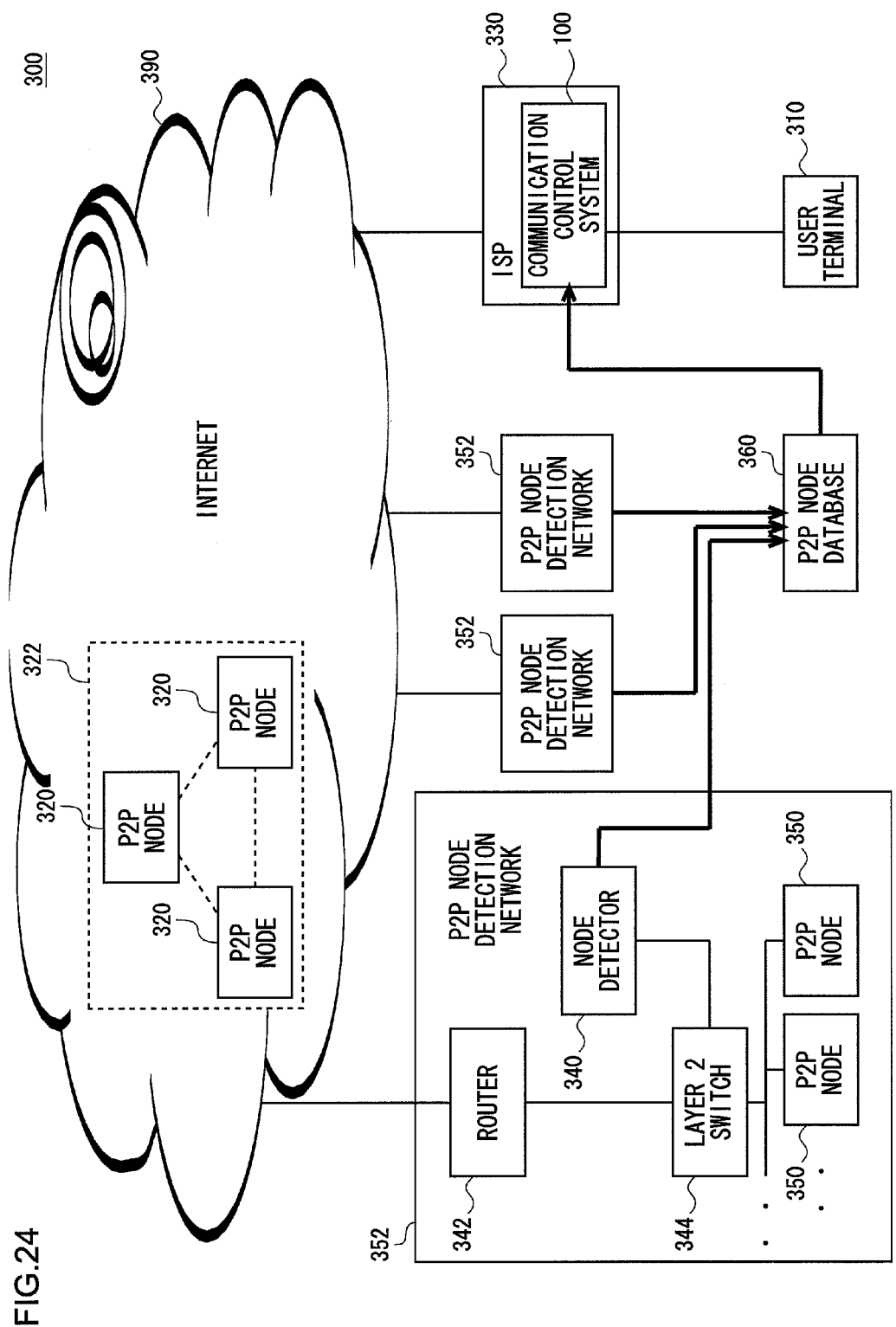
FIG. 24 is a diagram that shows another illustrative configuration of the communication management system according to the first embodiment.

FIG. 24 shows another illustrative configuration of the communication management system. The communication management system 300 shown in FIG. 24 differs from the communication management system 300 of FIG. 23 in the configuration of the P2P node detection network 352. More specifically, the node detector 340 is not provided between the router 342 and layer 2 switch 344 but is connected posterior to the layer 2 switch 344. In this example, all packets passing through the layer 2 switch 344 are copied and transmitted to the node detector 340, using the port mirroring function of the layer 2 switch 344. The node detector 340 analyzes an acquired packet to obtain identification information of a P2P node 320, and discards the packet. Other configurations and operations are the same as those of the communication management system 300 shown in FIG. 23.

Figure 25:
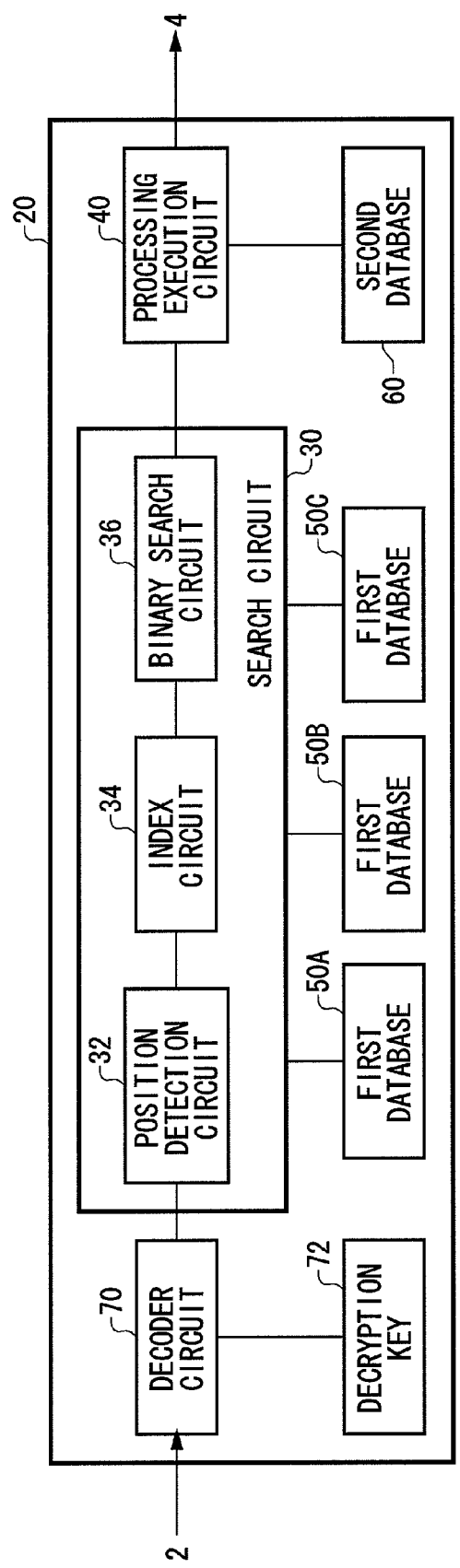
FIG. 25 is a diagram that shows a configuration of the packet processing circuit according to the first embodiment.

FIG. 25 shows a configuration of the packet processing circuit 20 of the present embodiment. The packet processing circuit 20 comprises a decoder circuit 70 and a decryption key 72 in addition to the configuration of the packet processing circuit 20 of the base technology shown in FIG. 4.

In a protocol used for a P2P application, there are often included distinctive character strings. When identification information including the name of a P2P application is provided in the header of a TCP packet, for example, whether or not the packet is derived from P2P communication can be determined by detecting such character strings. Accordingly, in the present embodiment, a character string unique to P2P communication included in a packet is detected using the position detection circuit 32 described in the base technology, so as to determine if it is P2P communication. A packet that includes a character string unique to P2P communication is discarded or subordinated by the process execution circuit 40, without being subjected to matching with the first database 50 performed by the index circuit 34 and binary search circuit 36. Accordingly, P2P communication can be detected efficiently to be filtered.

With some P2P applications, communication data is encrypted before being transmitted. The decoder circuit 70 decrypts the communication data of an acquired packet, using the decryption key 72 for decrypting communication data encrypted by a P2P application. When communication data is encrypted by a P2P application using common key cryptography, for example, the common key therefor is used as the decryption key 72 to decrypt the communication data thus encrypted. The decoder circuit 70 is provided as a dedicated hardware circuit configured with a wired logic circuit having no CPU or OS, as described in the base technology. The decryption key 72 may be provided to be rewritable from the outside. Accordingly, the packet processing circuit 20 can respond flexibly to the case where the decryption key of a P2P application is changed. Also, the packet processing circuit 20 can be commonly used even when a different P2P application is executed.

Also in the case above, the position detection circuit 32 detects a character string unique to P2P communication in the decrypted communication data. If the packet is not derived from P2P communication, decryption process by the decoder circuit 70 leaves a meaningless data string, so that such character string unique to P2P communication will not be detected. Therefore, whether or not a packet is derived from P2P communication can be determined by checking if there is included a character string unique to P2P communication.

Second Embodiment

Figure 26:
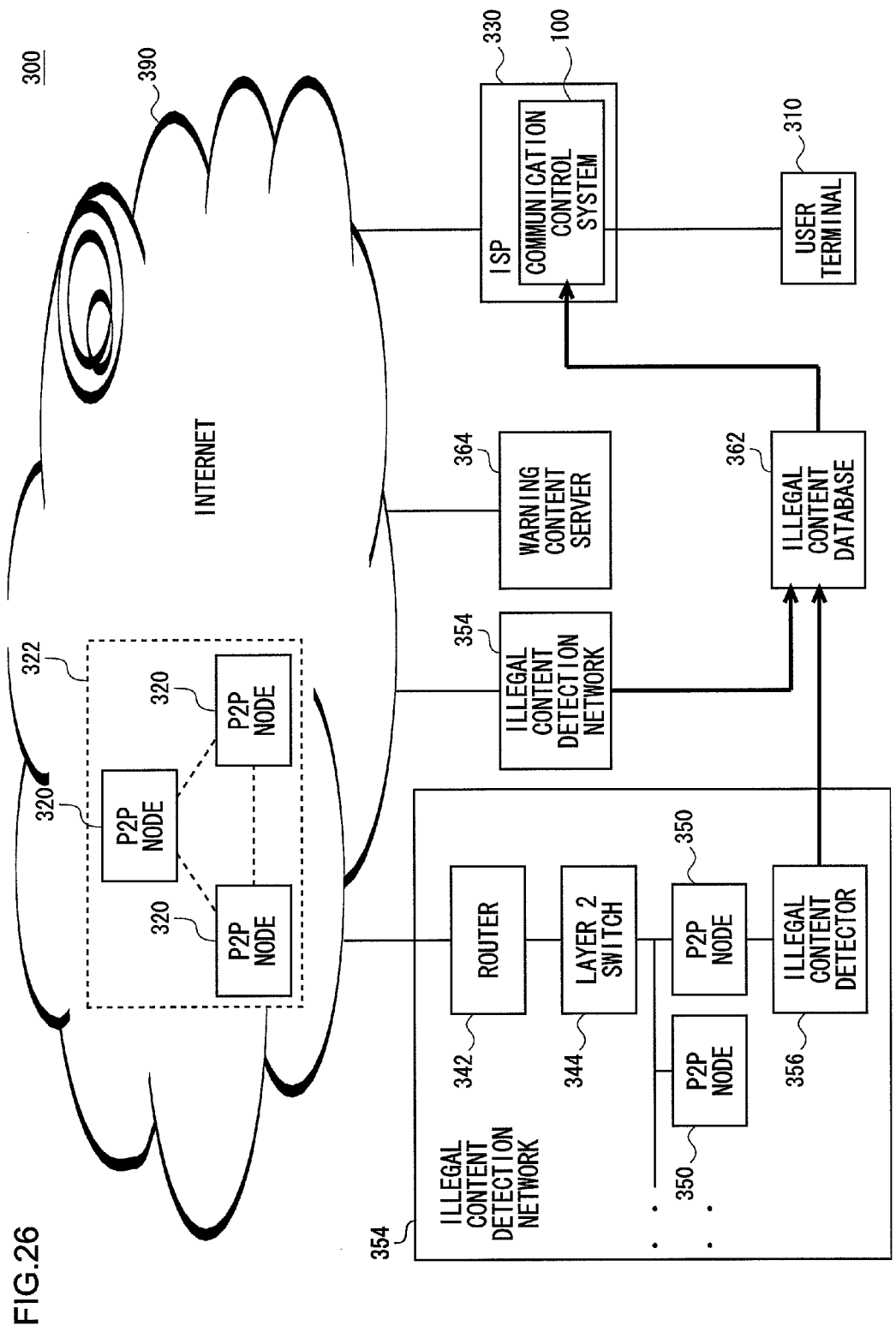
FIG. 26 is a diagram that shows a configuration of a communication management system according to a second embodiment.

FIG. 26 shows a configuration of a communication management system according to the second embodiment. The communication management system 300 manages distribution of contents provided by P2P nodes 320.

The communication management system 300 of the present embodiment differs from the communication management system 300 of the first embodiment shown in FIG. 23 in: comprising illegal content detection networks 354 instead of the P2P node detection networks 352; comprising an illegal content database 362 instead of the P2P node database 360; and further comprising a warning content server 364. The illegal content detection network 354 comprises an illegal content detector 356 instead of the node detector 340 provided in the P2P node detection network 352 of the first embodiment shown in FIG. 23. Other configurations and operations in the communication management system 300 are the same as those in the first embodiment.

When a P2P node 350 receives from a P2P node 320 a content of which distribution should be controlled, the illegal content detector 356 detects the identification information of the content and registers it in the illegal content database 362. The illegal content detector 356 may have, for example, a virus detection program for detecting virus-infected contents, so as to detect identification information of such contents. The illegal content detector 356 may also detect identification information of an image content or a moving image content when the content includes an inappropriate image of which distribution should be controlled. Thus, the illegal content detector 356 detects not only identification information of contents of which distribution is illegal, but also identification information of contents of which distribution should be controlled, such as a moving image including violent scenes or an image offensive to public order and morals. The illegal content detector 356 may accept the designation of an inappropriate content from an operator who checks contents to detect inappropriate contents, so as to detect the identification information of such content. The identification information may include the file name, file size, or hash value, such as MD5, of the content. The detected identification information is stored in the illegal content database 362 using a leased line or VPN.

The data registered in the illegal content database 362 is reflected in the first database 50 of the communication control apparatus 10 at a certain time by the database server 150 of the communication control system 100, as described in the base technology. Since the first database 50 may be updated each time a new record is added to the illegal content database 362, distribution of viruses or illegal contents can be controlled promptly.

The communication control apparatus 10 checks if a packet passing through the ISP 330 includes inappropriate content data or a request for the transmission of an inappropriate content, by searching through the first database 50 using the index circuit 34 and binary search circuit 36. If identification information of a content is registered in the first database 50, it means that the content is inappropriate. Accordingly, the process execution circuit 40 will perform processing to control the distribution of the content, such as discarding the packet to block the transmission thereof or changing the destination of the request of the packet transmission to the warning content server 364. If identification information is not registered in the first database 50, on the other hand, the process execution circuit 40 will transmit the packet to the network without performing processing of distribution control. Thus, distribution of inappropriate contents can be detected and controlled appropriately.

Figure 27:
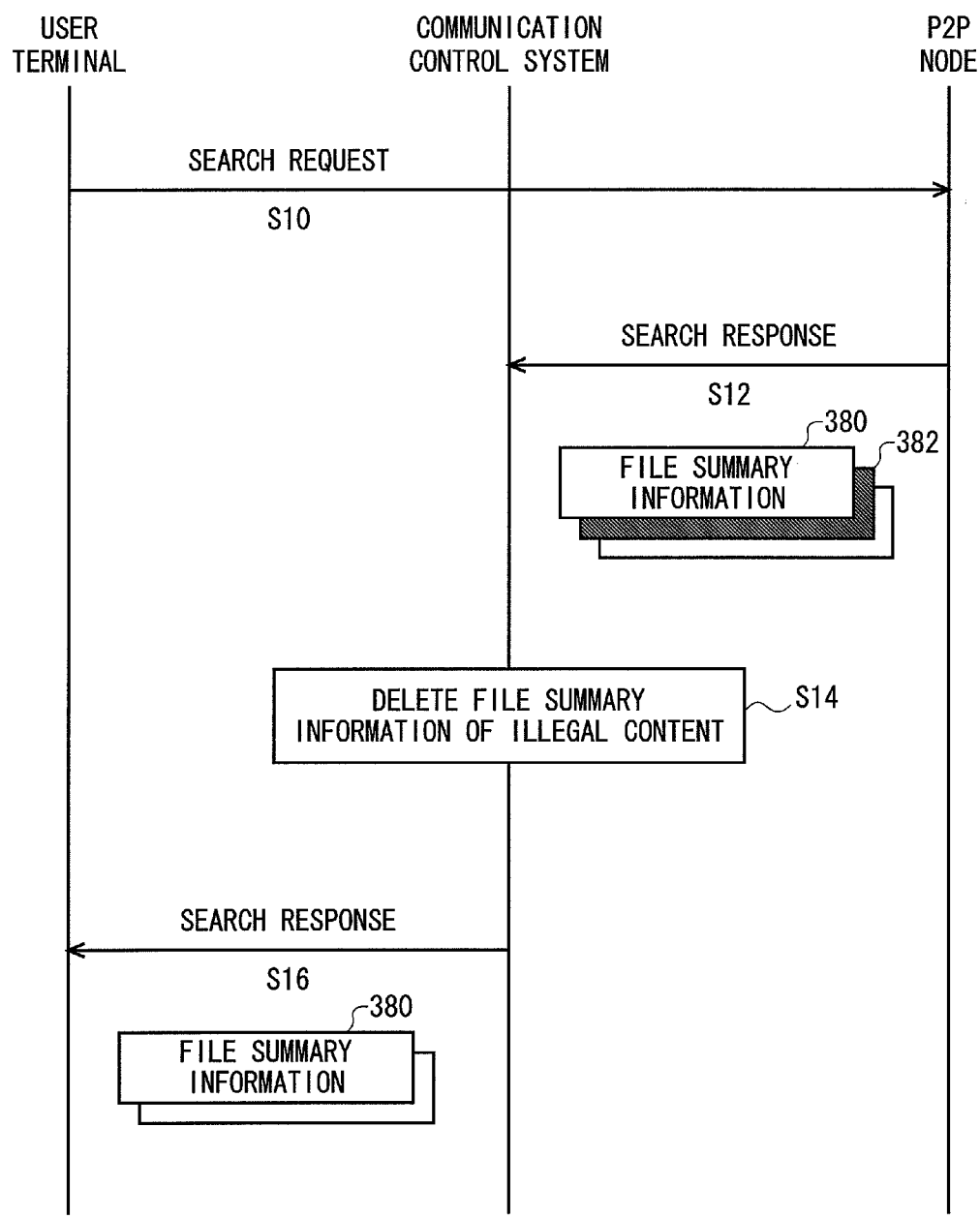
FIG. 27 is a sequential diagram that shows a procedure of a method for controlling distribution of an inappropriate content.

In the following, there will be described a specific method for controlling distribution of an inappropriate content. FIG. 27 is a sequential diagram that shows a procedure of a method for controlling distribution of an inappropriate content. In a file-sharing protocol used in the P2P network 322, when a node, such as a user terminal 310, issues a search request to find a content (S10), a P2P node 320 that has received the search request will transmit, in response, file summary information 380, 382, which includes the file name, file size and hash value of the content extracted through search (S12). If there is included not only file summary information 380 that relates to a content of which distribution is freely allowed, but also file summary information 382 that relates to an inappropriate content of which distribution should be controlled, the communication control system 100 will detect and delete the file summary information 382 of the inappropriate content (S14). The response packet in which the file summary information 382 of the inappropriate content has been deleted is then transmitted to the user terminal 310 (S16). Accordingly, even if a P2P node 320 has an inappropriate content and is capable of distributing it, the user terminal 310 will assume that the P2P node 320 has no such content because the file summary information 382 of the inappropriate content has been deleted from the search response. Therefore, the user terminal 310 cannot receive the inappropriate content, and hence, distribution of an inappropriate content can be thus restricted.

Figure 28:
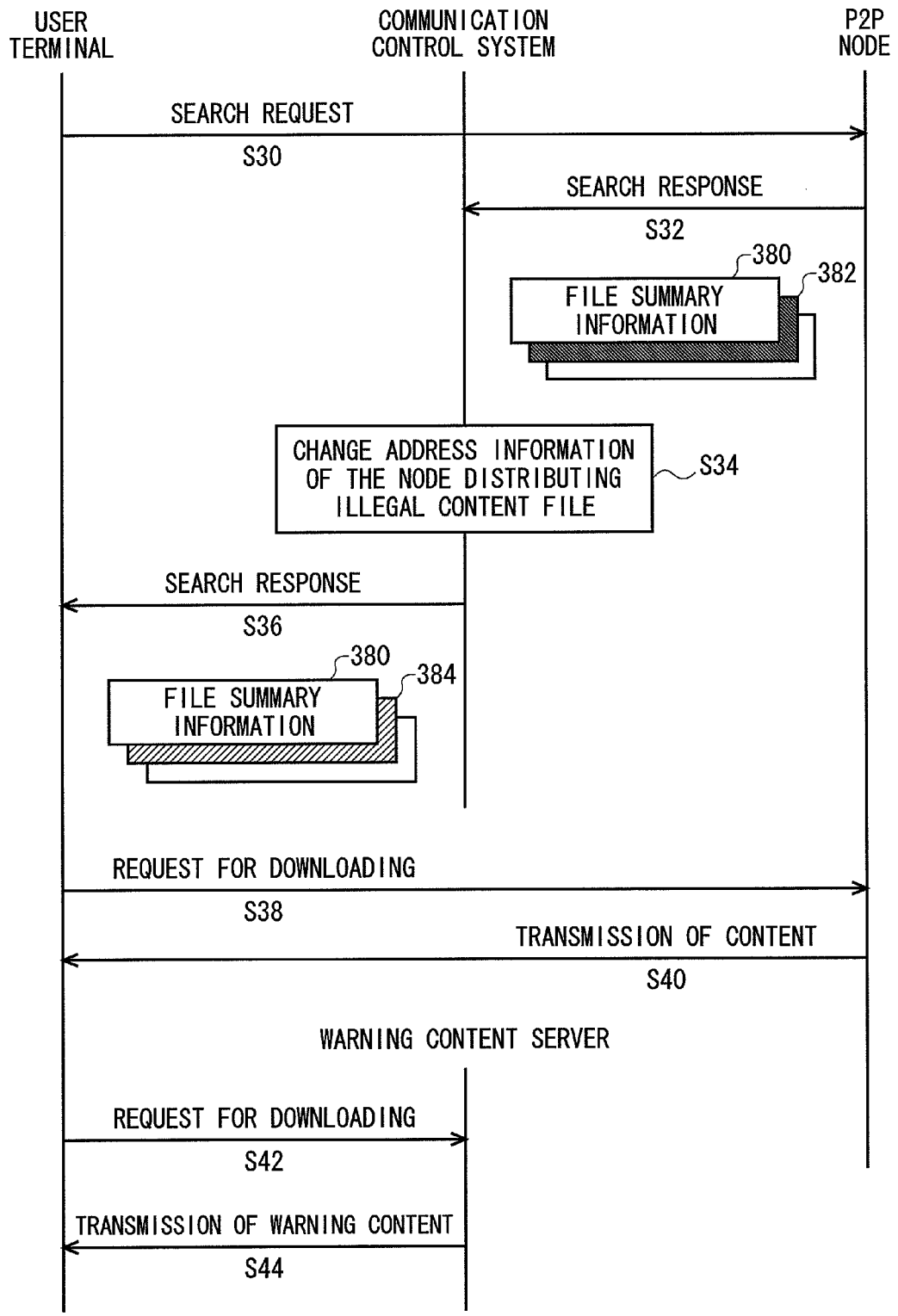
FIG. 28 is a sequential diagram that shows a procedure of another method for controlling distribution of an inappropriate content.

FIG. 28 is a sequential diagram that shows a procedure of another method for controlling distribution of an inappropriate content. When a user terminal 310 issues a search request to find a content (S30), a P2P node 320 that has received the search request will transmit, in response, file summary information 380, 382 of the content extracted through search (S32). If there is included file summary information 382 relating to an inappropriate content of which distribution should be controlled, the communication control system 100 will detect the file summary information 382, find the IP address of the node distributing the file, i.e. a P2P node 320 in this example, in the file summary information, and change such IP address to the IP address of the warning content server 364, which provides a warning content (S34). The communication control system 100 will then transmit to the user terminal 310 the response packet as search response (S36). When the user terminal 310 that has received the search response wishes to download a content of which distribution is not restricted, the user terminal 310 requests the downloading thereof from the P2P node 320 (S38); the P2P node 320 then transmits the requested content (S40). However, in the case of a content of which distribution is restricted, since the IP address of the destination of the request for downloading the content has been changed to the IP address of the warning content server 364, the user terminal 310 requests the downloading of the content from the warning content server 364 (S42). In response thereto, the warning content server 364 transmits to the user terminal 310 a warning content, which warns that the requested content is inappropriate and the distribution thereof is restricted (S44). Accordingly, even if a P2P node 320 has an inappropriate content and is capable of distributing it, the user terminal 310 cannot request the transmission of the content from the P2P node 320. Thus, distribution of inappropriate contents can be restricted.

Figure 29:
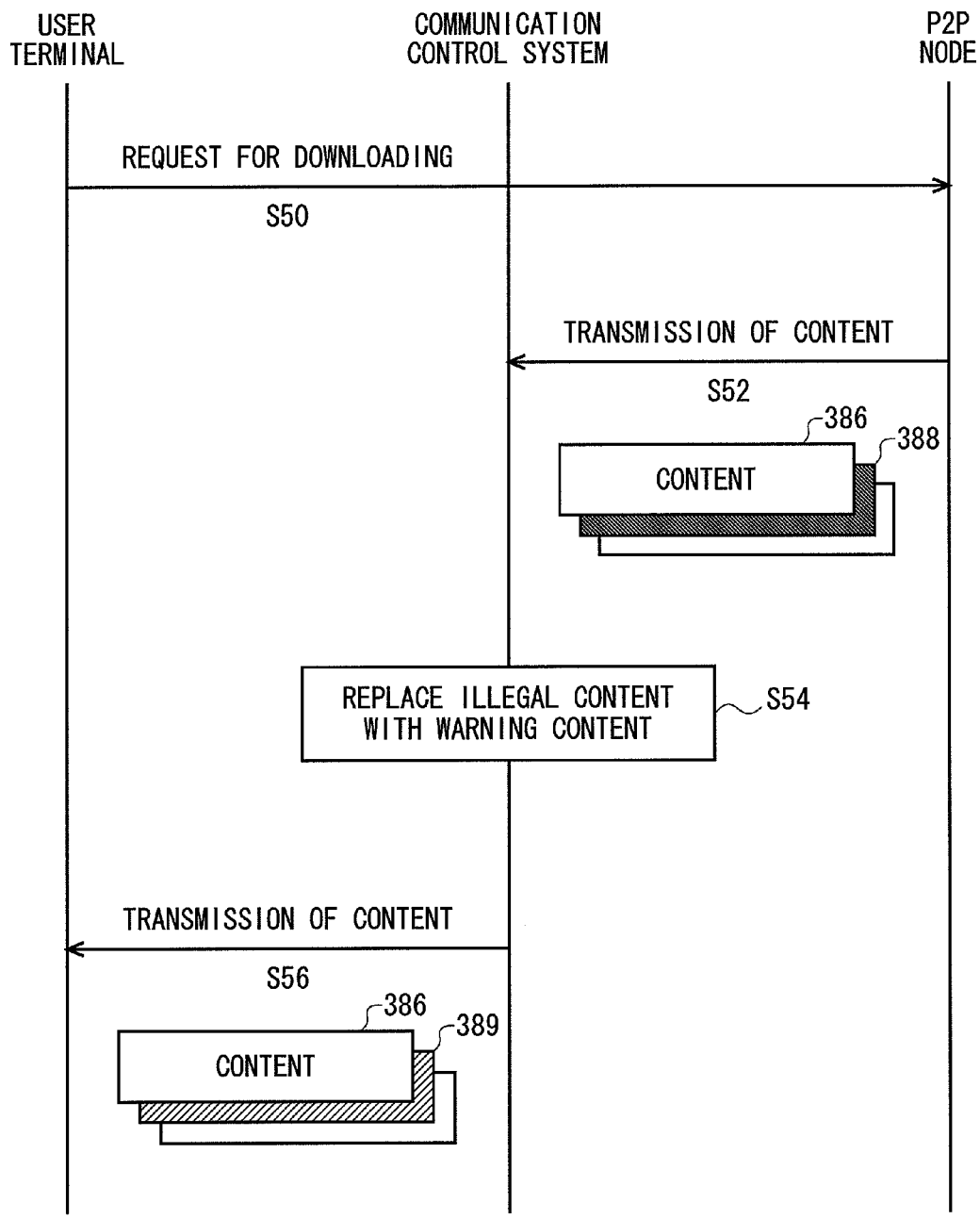
FIG. 29 is a sequential diagram that shows a procedure of yet another method for controlling distribution of an inappropriate content.

FIG. 29 is a sequential diagram that shows a procedure of yet another method for controlling distribution of an inappropriate content. A user terminal 310 requests downloading of contents from a P2P node 320 (S50), and the P2P node 320 transmits the contents thus requested to the user terminal 310 (S52); if there are included not only a content 386 of which distribution is freely allowed, but also an inappropriate content 388 of which distribution should be controlled, the communication control system 100 will replace the inappropriate content 388 with a warning content 389 for warning that the requested content is inappropriate and the distribution thereof is restricted (S54). The communication control system 100 will then transmit the contents to the user terminal 310 (S56).

Figure 30:
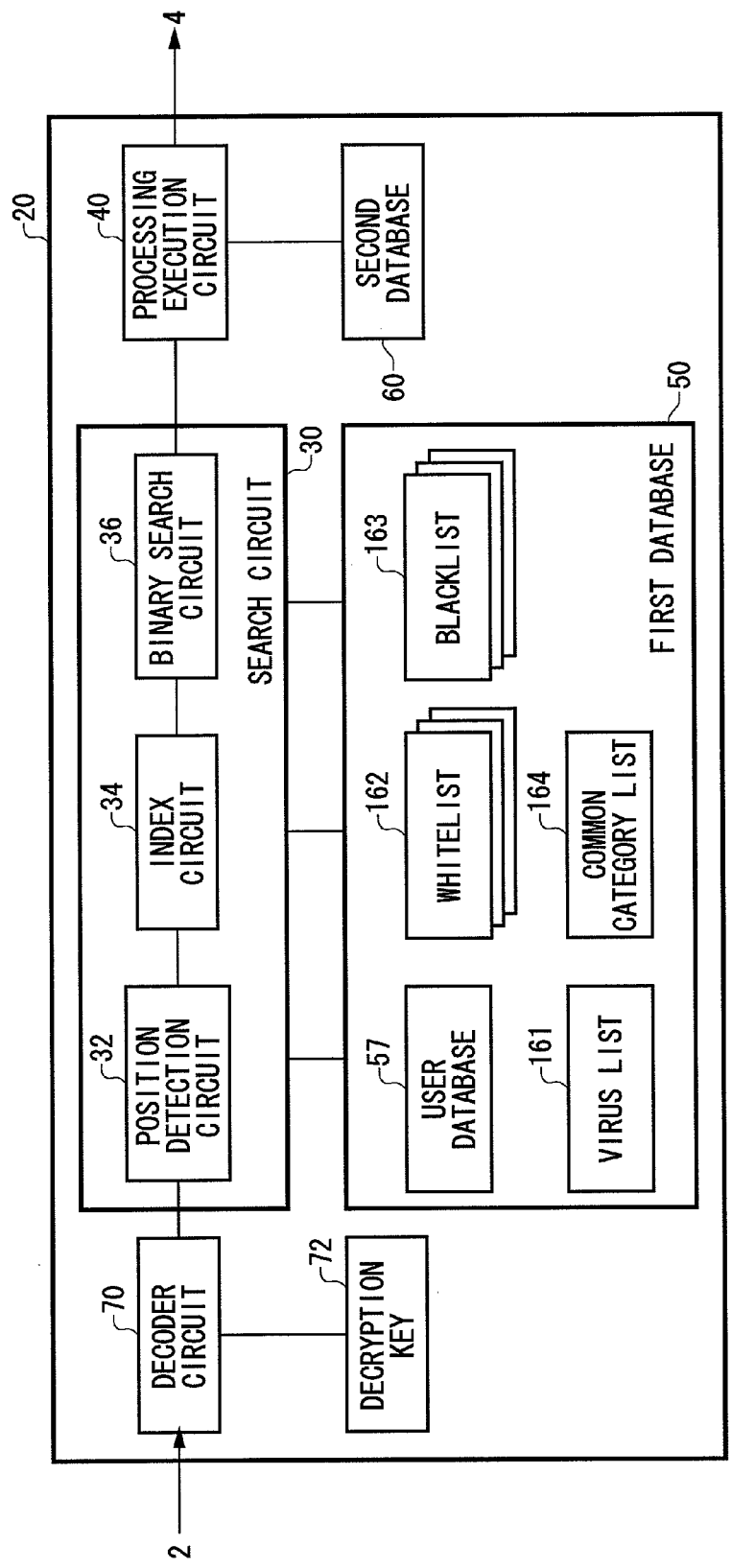
FIG. 30 is a diagram that shows an internal configuration of the packet processing circuit used to control content distribution.

FIG. 30 shows an internal configuration of the packet processing circuit 20 in the communication control apparatus 10 of the present embodiment. The packet processing circuit 20 comprises, as the first database 50, a user database 57, a virus list 161, a whitelist 162, a blacklist 163 and a common category list 164. The user database 57 stores information on users who use the communication control apparatus 10. The communication control apparatus 10 receives, from a user, information for identifying the user, and performs matching between the information received by the search circuit 30 therein and the user database 57 to authenticate the user. After the user is authenticated as a user registered in the user database 57, identification information of a content is checked against the virus list 161, whitelist 162, blacklist 163 and common category list 164, in order to determine whether or not the access to the content should be permitted. The whitelist 162 and blacklist 163 are provided for each user, and when a user ID is uniquely specified after the user authentication, the whitelist 162 and blacklist 163 for the user are provided to the search circuit 30.

The virus list 161 contains a list of identification information of contents containing computer viruses. If identification information of a content is included in the virus list 161, the distribution of the content will be blocked. Accordingly, even when a user is about to download a virus unconsciously, the access can be appropriately prohibited, thereby protecting users from viruses.

The whitelist 162 is provided for each user and contains a list of identification information of contents of which distribution is permitted. The blacklist 163 is also provided for each user but contains a list of identification information of contents of which distribution is prohibited. FIG. 31A shows an example of internal data of the virus list 161. Similarly, FIG. 31B shows an example of internal data of the whitelist 162, and FIG. 31C shows that of the blacklist 163. Each of the virus list 161, whitelist 162 and blacklist 163 contains a category number field 165, a file name field 166, a size field 167, and a hash value field 170.

The common category list 164 contains a list classifying contents into multiple categories, with which distribution of contents is controlled. FIG. 32 shows an example of internal data of the common category list 164. The common category list 164 also contains the category number field 165, file name field 166, size field 167 and hash value field 170.

The communication control apparatus 10 extracts file summary information transmitted in a file-sharing protocol or identification information from a content using the position detection circuit 32, and searches the virus list 161, whitelist 162, blacklist 163 and common category list 164 for the identification information using the index circuit 34 and binary search circuit 36.

FIGS. 33A, 33B, 33C and 33D show examples of internal data of the second database 60 used to control content distribution. FIG. 33A shows the search result and processing content with respect to the virus list 161. If identification information of a content matches identification information included in the virus list 161, the distribution of the content will be prohibited. FIG. 33B shows the search result and processing content with respect to the whitelist 162. If identification information of a content matches identification information included in the whitelist 162, the distribution of the content will be permitted. FIG. 33C shows the search result and processing content with respect to the blacklist 163. If identification information of a content matches identification information included in the blacklist 163, the distribution of the content will be prohibited.

FIG. 33D shows the search results and processing contents with respect to the common category list 164. As shown in FIG. 33D, a user can determine, with respect to each category, the permission or prohibition of the access to contents belonging to the category, in relation to the result of search through the common category list 164. The second database 60 for the common category list 164 contains a user ID field 168 and a category field 169. The user ID field 168 contains an ID for identifying a user. The category field 169 contains information that indicates the permission or prohibition of the access to contents belonging to the respective categories, which is determined by a user for each of 57 categories classified. If identification information of a content matches identification information included in the common category list 164, the permission for the access to the content will be determined according to the category that the content belongs to and the user ID. Although the number of common categories is 57 in FIG. 33D, it is not limited thereto.

Figure 34:
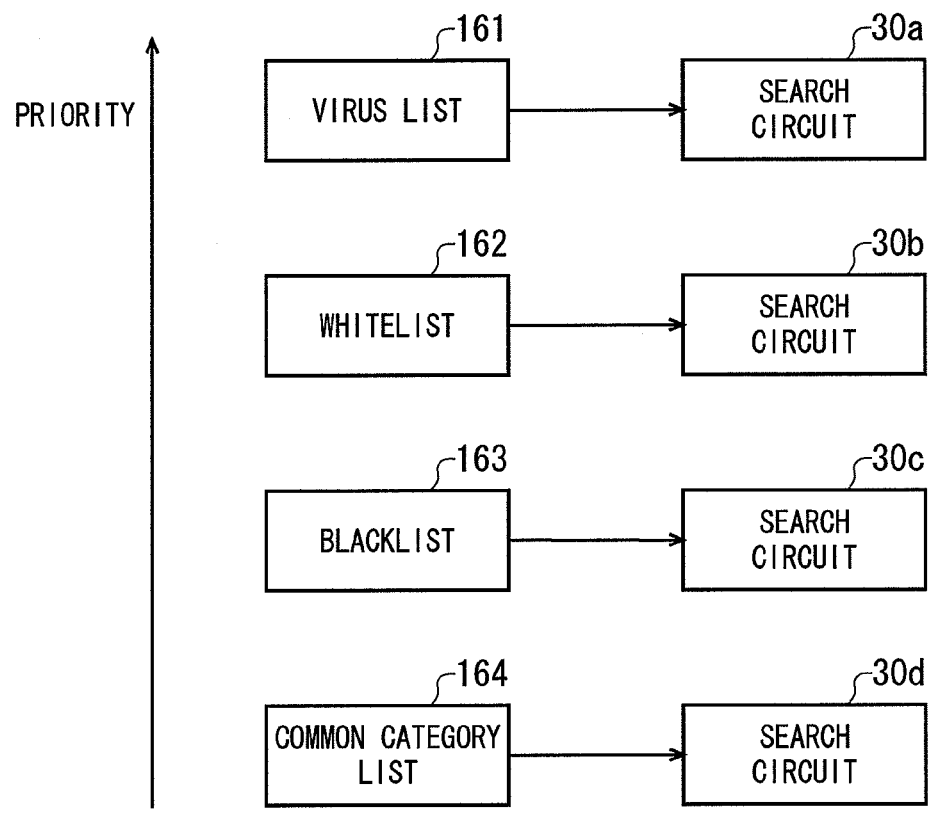
FIG. 34 is a diagram that shows the priorities of the virus list, whitelist, blacklist and common category list.

FIG. 34 shows the priorities of the virus list 161, whitelist 162, blacklist 163 and common category list 164. In the present embodiment, the virus list 161, whitelist 162, blacklist 163 and common category list 164 have higher priorities in this order. For example, even though identification information of a content appears in the whitelist 162 and the access thereto is permitted therein, the access will be prohibited if the identification information also appears in the virus list 161, as it is determined that the content contains a computer virus.

When conventional software-based matching is performed in consideration of such priorities, the matching is performed on the lists, for example, in descending order of priority and the first match is employed. Alternatively, the matching is performed on the lists in ascending order of priority, and the latest match is employed to replace the preceding match. In the present embodiment using the communication control apparatus 10 configured with a dedicated hardware circuit, in contrast, there are provided a search circuit 30a for performing matching with respect to the virus list 161, a search circuit 30b for performing matching with respect to the whitelist 162, a search circuit 30c for performing matching with respect to the blacklist 163, and a search circuit 30d for performing matching with respect to the common category list 164; these search circuits 30 perform matching simultaneously in parallel. When matches are found in multiple lists, the one with the highest priority is employed. Thus, even when multiple databases are provided and the priorities thereof are defined, the search time can be reduced remarkably.

The priorities of the virus list 161, whitelist 162, blacklist 163 and common category list 164, with which the permission of access is determined, may be defined in the second database 60, for example. The conditions in the second database 60 may be modified depending on the priorities of the lists.

Therefore, when controlling content distribution using multiple databases, by defining priorities of the databases to perform processing according thereto, and also by providing the highest priority to the filtering with the virus list 161, distribution of a content including a virus can be certainly prohibited, irrespective of the conditions in the whitelist 162 or the like defined by the user. This can appropriately protect users from viruses or the likes.

If a packet includes a content of which distribution is not controlled, the process execution circuit 40 will transmit the packet to a network without processing it. In the case of a content of which distribution should be restricted, the process execution circuit 40 will perform processing as stated above. For example, if the distribution control shown in FIG. 27 is performed, the process execution circuit 40 will delete the file summary information of the content detected by the search circuit 30 from the packet before transmitting the packet to the network. If the distribution control shown in FIG. 28 is performed, the process execution circuit 40 will find the IP address of the node distributing the file in the file summary information of the content detected by the search circuit 30 and change such IP address to the IP address of the warning content server 364 stored in the second database 60, etc. in advance, before transmitting the packet to the network. If the distribution control shown in FIG. 29 is performed, the process execution circuit 40 will replace the content detected by the search circuit 30 with a warning content stored in the second database 60, etc. before transmitting the packet to the network. The warning content may be provided from the warning content server 364 to the communication control apparatus 10.

With the configuration and operation as described above, access to an inappropriate content can be prohibited. Also, since the search circuit 30 is a dedicated hardware circuit configured with FPGA, etc., high-speed search processing can be achieved, as discussed previously, and distribution control can be performed with minimal effect on the traffic. By providing such filtering service, an ISP 330 can provide added value, thus gaining more users.

The whitelist 162 or blacklist 163 may be mutually provided for all users. Also, the control of content distribution described above may be applied to all packets without performing user authentication. In such case, the user database 57 need not be provided.

The present invention has been described with reference to the embodiment. The embodiment is intended to be illustrative only and it will be obvious to those skilled in the art that various modifications to constituting elements or processes could be developed and that such modifications are also within the scope of the present invention.

INDUSTRIAL APPLICABILITY

The present invention is applicable to a communication management system that manages distribution of contents.

The invention claimed is:
1. A communication management system, comprising:
a terminal which has a peer to peer connection to communicate with a node conducting peer to peer communication;
a content detector which detects identification information of a content of which distribution should be controlled, among contents that the terminal has received from the node, and registers the identification information in a content database;
a communication control apparatus having an ID database storing the detected identification information and referring to the ID database to control transmission of the content of which distribution should be controlled; and
a database server which refers to the content database to update the ID database of the communication control apparatus,
a warning content server which, when a requested content is the content of which distribution should be controlled, transmits a warning content notifying that the requested content is inappropriate and the distribution thereof is restricted;
the content detector including:
an acquiring part which acquires a content that the terminal has received from the node;
a first detector which determines if an acquired content is a virus-infected content and detects the identification information of a virus-infected content;
a second detector which accepts the designation of an inappropriate content from an operator who checks acquired contents to detect inappropriate contents, and detects the identification information of the content; and
a register which registers detected identification information in the content database,
the communication control apparatus including:
the ID database;

a search circuit which acquires data of a content and searches the ID database for the identification information of the content; and a process execution circuit which performs processing for controlling the distribution of the content in accordance with the search result of the search circuit, wherein, when in the peer to peer communication the node requested to search for a content transmits, to a terminal of the request source of the search, a response including identification information of a content registered in the ID database, the process execution circuit changes the address of a node distributing the content to the address of a warning content server which issues a warning that the distribution of the content should be restricted, and transmits the search result to the terminal;

wherein, when the terminal having received the search result downloads a content of which distribution is not restricted, the terminal requests downloading of the content from the node;

wherein, when the terminal having received the search result downloads a content of which distribution is restricted, since the address of the destination of the request for downloading the content has been changed to the address of the warning content server, the terminal requests downloading of the content from the warning content server; and wherein, the warning content server having received the request from the terminal transmits to the terminal, in response to the request, a warning content, which warns that the requested content is inappropriate and the distribution of the content is restricted.

2. The communication management system of claim 1, wherein the identification information of the content includes a file name, a file size, or a hash value of the content.

3. The communication management system of claim 1, wherein the communication control apparatus is configured with a wired logic circuit.

4. A communication management system, comprising:
a terminal which has a peer to peer connection to communicate with a node conducting peer to peer communication;
a content detector which detects identification information of a content of which distribution should be controlled, among contents that the terminal has received from the node, and registers the identification information in a content database;
a communication control apparatus having an ID database storing the detected identification information and referring to the ID database to control transmission of the content of which distribution should be controlled; and
a database server which refers to the content database to update the ID database of the communication control apparatus,
the content detector including:
an acquiring unit which acquires a content that the terminal has received from the node;
a determining unit if an acquired content is a virus infected content and detects the identification information of a virus-infected content;
an accepting unit to accept the designation of an inappropriate content from an operator which checks acquired contents to detect inappropriate contents, and detects the identification information of the content; and
a registering unit which registers detected identification information in the content database,
the communication control apparatus including:
the ID database;

a search circuit which acquires data of a content and searches the ID database for the identification information of the content; and a process execution circuit which performs processing for controlling the distribution of the content in accordance with the search result of the search circuit, wherein, when a terminal requests downloading of contents from a node and the node transmits the contents thus requested to the terminal, if there are included not only a content of which distribution is freely allowed, but also a partial inappropriate content of which distribution should be controlled, since identification information of the partial content transmitted from the node to the terminal matches identification information registered in the ID database in the peer to peer communication, the process execution circuit replaces the partial content with a warning content for warning that the distribution of the content should be restricted and transmits the requested contents to the terminal.

5. The communication management system of claim 4, wherein the identification information of the content includes a file name, a file size, or a hash value of the content.

6. The communication management system of claim 4, wherein the communication control apparatus is configured with a wired logic circuit.

7. A communication management method, comprising:
a content detector's acquiring a content that a terminal has received from a node conducting peer to peer communication, the terminal having a peer to peer connection to communicate with the node;
a content detector's determining if an acquired content is a virus-infected content and detecting identification information of a virus-infected content;
a content detector's accepting the designation of an inappropriate content from an operator which checks acquired contents to detect inappropriate contents, and detecting the identification information of the content;
a content detector's registering detected identification information in a content database;
a database server's referring to the content database to update an ID database of a communication control apparatus controlling the distribution of a content;
a search circuit's acquiring data of a content and searching the ID database for the identification information of the content the search circuit being provided in the communication control apparatus; and,
wherein, when in the peer to peer communication the node requested to search for a content transmits, to a terminal of the request source of the search, a response including identification information of a content registered in the ID database, a process execution circuit changes the address of a node distributing the content to the address of a warning content server which issues a warning that the distribution of the content should be restricted, and transmits the search result to the terminal, the process execution circuit being provided in the communication control apparatus;
wherein, when the terminal having received the search result downloads a content of which distribution is not restricted, the terminal requests downloading of the content from the node;
wherein, when the terminal having received the search result downloads a content of which distribution is restricted, since the address of the destination of the request for downloading the content has been changed to the address of the warning content server, the terminal requests downloading of the content from the warning content server; and wherein, the warning content server having received the request from the terminal transmits to the terminal, in response to the request, a warning content, which warns that the requested content is inappropriate and the distribution of the content is restricted.

8. A communication control apparatus, comprising:

an ID database configured to store identification information of a content detected as a content of which distribution should be controlled, among contents transmitted between nodes through peer to peer communication;

a search circuit configured to acquire data of a content and search the ID database for identification information of the content;

a process execution circuit configured to perform processing for controlling the distribution of the content in accordance with the search result of the search circuit; and a warning content server which, when a requested content is the content of which distribution should be controlled, transmits a warning content notifying that the requested content is inappropriate and the distribution thereof is restricted, wherein, the process execution circuit is configured to, when in the peer to peer communication the node requested to search for a content transmits, to a terminal of the request source of the search, a response including identification information of a content registered in the ID database, changes the address of a node distributing the content to the address of a warning content server which issues a warning that the distribution of the content should be restricted, and transmits the search result to the terminal;

wherein, when the terminal having received the search result downloads a content of which distribution is not restricted, the terminal requests downloading of the content from the node;

wherein, when the terminal having received the search result downloads a content of which distribution is restricted, since the address of the destination of the request for downloading the content has been changed to the address of the warning content server, the terminal requests downloading of the content from the warning content server; and wherein, the warning content server having received the request from the terminal transmits to the terminal, in response to the request, a warning content, which warns that the requested content is inappropriate and the distribution of the content is restricted.

9. A communication management method, comprising:

a content detector's acquiring a content that a terminal has received from a node conducting peer to peer communication, the terminal having a peer to peer connection to communicate with the node;

a content detector's determining if an acquired content is a virus-infected content and detecting identification information of a virus-infected content;

a content detector's accepting the designation of an inappropriate content from an operator who checks acquired contents to detect inappropriate contents, and detecting the identification information of the content;

a content detector's registering detected identification information in a content database;

a database server's referring to the content database to update an ID database of a communication control apparatus controlling the distribution of a content;

a search circuit's acquiring data of a content and searching the ID database for the identification information of the content, the search circuit being provided in the communication control apparatus; and, wherein, when a terminal requests downloading of contents from a node and the node transmits the contents thus requested to the terminal, if there are included not only a content of which distribution is freely allowed, but also a partial inappropriate content of which distribution should be controlled, since identification information of the partial content transmitted from the node to the terminal matches identification information registered in the ID database in the peer to peer communication, the communication control apparatus's replacing the partial content with a warning content for warning that the distribution of the content should be restricted and transmits the requested contents to the terminal.

10. A communication control apparatus, comprising:

an ID database configured to store identification information of a content detected as a content of which distribution should be controlled, among contents transmitted between nodes through peer to peer communication;

a search circuit configured to acquire data of a content and search the ID database for the identification information of the content; and a process execution circuit configured to perform processing for controlling the distribution of the content in accordance with the search result of the search circuit, wherein, the process execution circuit is configured to, when a terminal requests downloading of contents from a node and the node transmits the contents thus requested to the terminal, if there are included not only a content of which distribution is freely allowed, but also a partial inappropriate content of which distribution should be controlled, since identification information of the partial content transmitted from the node to the terminal matches identification information registered in the ID database in the peer to peer communication, the process execution circuit replaces the partial content with a warning content for warning that the distribution of the content should be restricted and transmits the requested contents to the terminal.

* * * * *